United States Patent
Deck et al.

(10) Patent No.: US 10,846,882 B2
(45) Date of Patent: Nov. 24, 2020

(54) SYSTEM AND METHOD OF DIMENSIONAL CALIBRATION FOR AN ANALYTICAL MICROSCOPE

(71) Applicant: THERMO ELECTRON SCIENTIFIC INSTRUMENTS LLC, Madison, WI (US)

(72) Inventors: Francis J. Deck, Madison, WI (US); Carla S. Draper, Madison, WI (US); Alan Ronemus, Oregon, WI (US); William Robert Keefe, Oconomowoc, WI (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 89 days.

(21) Appl. No.: 15/806,076

(22) Filed: Nov. 7, 2017

(65) Prior Publication Data

US 2018/0130233 A1   May 10, 2018

Related U.S. Application Data

(60) Provisional application No. 62/418,969, filed on Nov. 8, 2016.

(51) Int. Cl.
```
G06T 7/80      (2017.01)
G02B 21/36     (2006.01)
G06T 7/20      (2017.01)
G01J 3/02      (2006.01)
G01J 3/28      (2006.01)
```
(Continued)

(52) U.S. Cl.
CPC .............. *G06T 7/80* (2017.01); *G01J 3/0275* (2013.01); *G01J 3/2823* (2013.01); *G02B 21/34* (2013.01); *G02B 21/365* (2013.01); *G06T 7/20* (2013.01); *H04N 17/002* (2013.01); *G06T 2207/10056* (2013.01)

(58) Field of Classification Search
CPC .. G06T 7/80; G06T 7/20; G02B 21/34; G02B 21/365; G01J 3/275; G01J 3/2823
USPC .......................................................... 348/79
See application file for complete search history.

(56) References Cited

U.S. PATENT DOCUMENTS

| | | |
|---|---|---|
| 5,109,430 A | 4/1992 | Nishihara et al. |
| 2009/0048510 A1 | 2/2009 | Miller et al. |

(Continued)

FOREIGN PATENT DOCUMENTS

| | | |
|---|---|---|
| JP | H02141601 A | 5/1990 |
| JP | H05183916 A | 7/1993 |

(Continued)

OTHER PUBLICATIONS

Huang et al., "Displacement measurement with nanoscale resolution using a coded micro-mark and digital image correlation," Optical Engineering, Soc. of Photo-Optical Instrumentation Engineers, Bellingham, 53(12), 124103-1 through 124103-6, 2014.

(Continued)

*Primary Examiner* — Sath V Perungavoor
*Assistant Examiner* — Kristin Dobbs
(74) *Attorney, Agent, or Firm* — William R. McCarthy, III

(57) ABSTRACT

An embodiment of a calibration element for an analytical microscope is described that comprises a substantially non-periodic pattern of features that exhibit contrast when illuminated by a light beam.

33 Claims, 16 Drawing Sheets

(51) Int. Cl.
G02B 21/34 (2006.01)
H04N 17/00 (2006.01)

(56) References Cited

U.S. PATENT DOCUMENTS

| | | | |
|---|---|---|---|
| 2015/0201117 A1* | 7/2015 | Acher | G01Q 40/00 348/79 |
| 2016/0170197 A1 | 6/2016 | Kenny et al. | |
| 2016/0282598 A1 | 9/2016 | Besley et al. | |

FOREIGN PATENT DOCUMENTS

| | | |
|---|---|---|
| JP | 2004070036 A | 3/2004 |
| JP | 3188019 U | 12/2013 |
| WO | WO-2015066756 A1 * | 5/2015 |
| WO | WO2015066756 A1 | 5/2015 |

OTHER PUBLICATIONS

Pan et al., "High-Accuracy 2D Digital Image Correlation Measurements with Bilateral Telecentric Lenses: Error Analysis and Experimental Verification," Experimental Mechanics, 50(9), 1719-1733, 2013.

Pan et al., "High-Accuracy 2D Digital Image Correlation Measurements with Bilateral Telecentric Lenses: Error Analysis and Experimental Verification," Experimental Mechanics, 2013, vol. 53, pp. 1719-1733.

International Preliminary Report on Patentability for International Application No. PCT/US2017/060419 dated May 23, 2019, 15 pages.

JP2019-545729; Official Action—English translation, dated Jun. 15, 2020; 6 pp.

* cited by examiner

610
Calculated
Maximum

Image shift in pixels (vert, horiz) 0.734943214961 209.666194696

810
Calculated
Maximum

1010
Calculated
Maximum

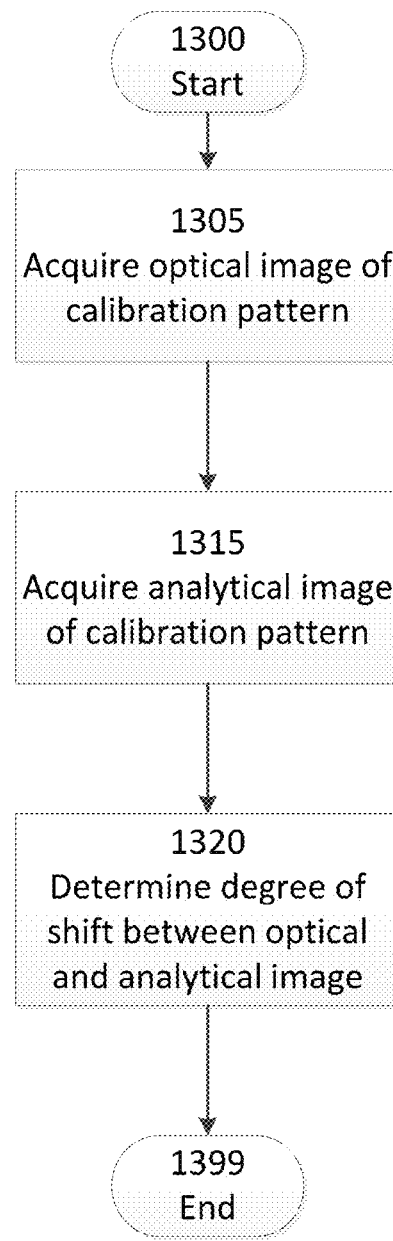

10 pixels = 1 μm

SYSTEM AND METHOD OF DIMENSIONAL CALIBRATION FOR AN ANALYTICAL MICROSCOPE

CROSS-REFERENCE TO RELATED APPLICATION

This application claims the benefit of U.S. provisional patent application No. 62/418,969, filed Nov. 8, 2016. The contents of this application are incorporated by reference in their entirety.

FIELD OF THE INVENTION

The present invention is generally directed to an improved calibration scale and method for calibration of an analytical microscope.

BACKGROUND

It is generally appreciated that different embodiments of analytical microscope are used for a variety of applications and typically provide multiple modes of operation through a shared beam path for examination of a sample. For instance, an embodiment of an analytical microscope configured for chemical or material analysis may provide two or more modes of operation that include visible light observation, and use of an analytical beam to examine a sample at wavelengths of interest for the chemical or material analysis. Those of ordinary skill in the art appreciate that chemical or material analysis may be accomplished using infrared light, Raman scattered light, or other approaches typically used in the related art.

Typical embodiments of analytical microscope produce images taken of samples at various magnification levels with accurate dimensions and coordinates in physical units that enable detailed analysis of the sample in the image. Examples of physical units used are well known to those of ordinary skill in the related art (e.g. metric units such as microns ($\mu$m)), imperial units such as inches, ratios (e.g. $\mu$m:pixel), etc). In general, the dimensional scale provided in each image depends on the optical configuration chosen by the user (e.g., magnification levels, accessories, and so forth) and it is important that the dimensional scale provided in each image be faithful to the actual magnification of the microscope in any given configuration. It is also appreciated that an absolute position reference for the microscope stage is important to enable correlation of the dimensional scale in an image to the physical position of the microscope stage so that, for instance, the user can reliably return to a desired region of interest on a specimen in the future.

The process of acquiring and applying accurate scale factors and absolute coordinates is commonly referred to as "calibration" of an analytical microscope. In some cases, calibration is achieved by a laborious and error prone process, using a calibrated "stage micrometer" as a position reference. For example, stage micrometers typically include a reticle that comprises an accurate scale that can be viewed through an objective lens, or imaged using optical imaging components through the microscope (e.g. a video camera). Standard reticle embodiments comprise a regularly spaced series of divisions (e.g. a line or other visual indicator) ordered in a single axis that can provide one or more reference elements when viewed through an eyepiece or in an image. In the presently described example, two reticle divisions can provide reference points used to calculate a distance value in pixels (e.g. between two selected points on the reticle). The spacing of the divisions of the reticle are precisely calibrated and known so that a conversion factor based on the magnification level can be used to determine the dimensional scale at the particular microscope configuration (e.g. $\mu$m:pixel).

It is generally appreciated that visually based calibration processes using reticles is subject to error because it requires a user to manually select points on a reticle (e.g. an edge of a line of the reticle scale) that is used to base a measure of distance at a particular magnification. The process must also be repeated with different reticle orientations if calibration in different axes is desired. For example, what points the user selects is up to the individual discretion and opinion of the particular user and is not necessarily true to, or consistent with the exact position provided by the reticle scale. Variation in the user selected points then translates into error in the calculated number of pixels and the resulting information determined from the pixel calculation. Examples of the possible consequences of such error include what may be referred to as "image registration error" which refers to the inability to accurately align multiple images (e.g. joined or overlaid) due to the inaccuracy of the scales associated with the respective images.

It is also generally appreciated that standard reticle embodiments suffer from the fact that they are limited to a single, periodic, scale level that are difficult to use across a broad range of magnification and across multiple axes. For example, the full range of magnification available in some embodiments of analytical microscope can span about a 20 fold change of magnification where a single standard reticle does not have a sufficient scale to enable accurate resolution of the divisions across the entire range. In other words, the single periodicity in the scale of a standard reticle may work for a particular range of magnification but has a strict limit of the number of divisions in the field of view at higher magnifications as well as an inability to resolve the divisions at lower magnifications. Therefore, one must use multiple embodiments of standard reticle with different scales, or must choose to work within the limited magnification range of a single standard reticle embodiment.

It is also important to note that the periodicity of standard reticle embodiments is not amenable to automation using calibration software which typically cannot recognize every mark on the scale necessary to produce an accurate calibration result. In the present example, calibration software that employs Fourier transformations of images of standard reticles typically produce multiple maxima (e.g. peaks) instead of a single maxima that can be accurately used to calibrate the dimensional scale of the image.

Yet another problem that can arise from an inability to effectively calibrate across and broad range of magnification includes an inability to automatically detect the level of the magnification setting of the analytical microscope (e.g. identify the magnification level of the objective lens). For example, there is generally no automated indication that informs computer software or a user when the microscope magnification setting has changed by some mechanism. Those of ordinary skill in the related art appreciate that changes in magnification can occur via a user (e.g. through manual alteration of objective lenses) or via changes in component characteristics over time (e.g. degradation of optical configuration) or in response to environmental change (e.g. temperature). In some cases elaborate means of automatically identifying the components in the system can provide some indication that the magnification level is different than the expected level, but even such means can be subject to error. For example, use of an incorrect magnification level can lead to deleterious results such as physical contact between the objective lens and a sample or stage that can potentially damage components or render a sample un-useable. Further, analysis using a different magnification setting that what is assumed can cause a user or software to lose track of a desired region of interest on the sample.

It will also be appreciated that different objective lenses with different levels of magnification generally will have some difference in the precise position of the focal point relative to each other (also sometimes referred to as a focal spot). Further, the same objective lens may have a degree of difference in focal spot position when the objective lens is moved out of the optical path and then returned back into the optical path (e.g. may include a 2.5 µm difference in position). These differences may be referred to as "parcentricity errors" which can cause positional differences of elements in the resulting images without accurate measurement and calculation of offset correction values.

Therefore, there is a need for an improved calibration scale that is amenable to automation and useable across a broad range of magnification levels.

SUMMARY

Systems, methods, and products to address these and other needs are described herein with respect to illustrative, non-limiting, implementations. Various alternatives, modifications and equivalents are possible.

An embodiment of a calibration element for an analytical microscope is described that comprises a substantially non-periodic pattern of features that exhibit contrast when illuminated by a light beam.

Also, an embodiment of a magnification measurement system is described that comprises a microscope stage configured for translation over known distances; a calibration element disposed on the microscope stage, the calibration element comprising a substantially non-periodic pattern of features that exhibit contrast when illuminated by a light beam; one or more detectors that collect a plurality of images of the non-periodic pattern of features through an objective lens; and a computer configured to determine a magnification level of the objective lens based on correlation of images of the non-periodic pattern before and after translation.

Further, an embodiment of a method for measuring magnification is described that, comprises acquiring an image of a non-periodic pattern of features that exhibit contrast when illuminated by a light beam, wherein a calibration element comprises the non-periodic pattern and is disposed on a stage of an analytical microscope; translating the stage over a known distance; acquiring a second image of the non-periodic pattern; and determining a magnification level of an objective lens that acquired the first image and the second image based on a correlation of the non-periodic pattern in the first image and the second image.

In addition, an embodiment of a method for determining a shift between images is described that comprises acquiring an optical image of a non-periodic pattern of features that exhibit contrast when illuminated by a light beam, wherein a calibration element comprises the non-periodic pattern and is disposed on a stage of an analytical microscope; acquiring an analytical image of the non-periodic pattern; and determining a shift between the optical image and the analytical image based on a correlation of the non-periodic pattern in the optical image and the analytical image.

The above embodiments and implementations are not necessarily inclusive or exclusive of each other and may be combined in any manner that is non-conflicting and otherwise possible, whether they are presented in association with a same, or a different, embodiment or implementation. The description of one embodiment or implementation is not intended to be limiting with respect to other embodiments and/or implementations. Also, any one or more function, step, operation, or technique described elsewhere in this specification may, in alternative implementations, be combined with any one or more function, step, operation, or technique described in the summary. Thus, the above embodiment and implementations are illustrative rather than limiting.

BRIEF DESCRIPTION OF THE DRAWINGS

The above and further features will be more clearly appreciated from the following detailed description when taken in conjunction with the accompanying drawings. In the drawings, like reference numerals indicate like structures, elements, or method steps and the leftmost digit of a reference numeral indicates the number of the figure in which the references element first appears (for example, element 120 appears first in FIG. 1). All of these conventions, however, are intended to be typical or illustrative, rather than limiting.

FIG. 13 is a functional block diagram of one embodiment of a method for determining a degree of shift between and optical image and an analytical image;

Like reference numerals refer to corresponding parts throughout the several views of the drawings.

DETAILED DESCRIPTION OF EMBODIMENTS

As will be described in greater detail below, embodiments of the described invention include a calibration element that comprises a substantially non-periodic pattern of features that enables calibration of an analytical microscope across a broad range of magnification levels. More specifically, the substantially non-periodic pattern comprises features in multiple dimensions that enable calibration software to automate the process and produce a superior result, especially when compared to manual methods requiring visual inspection.

Figure 1:
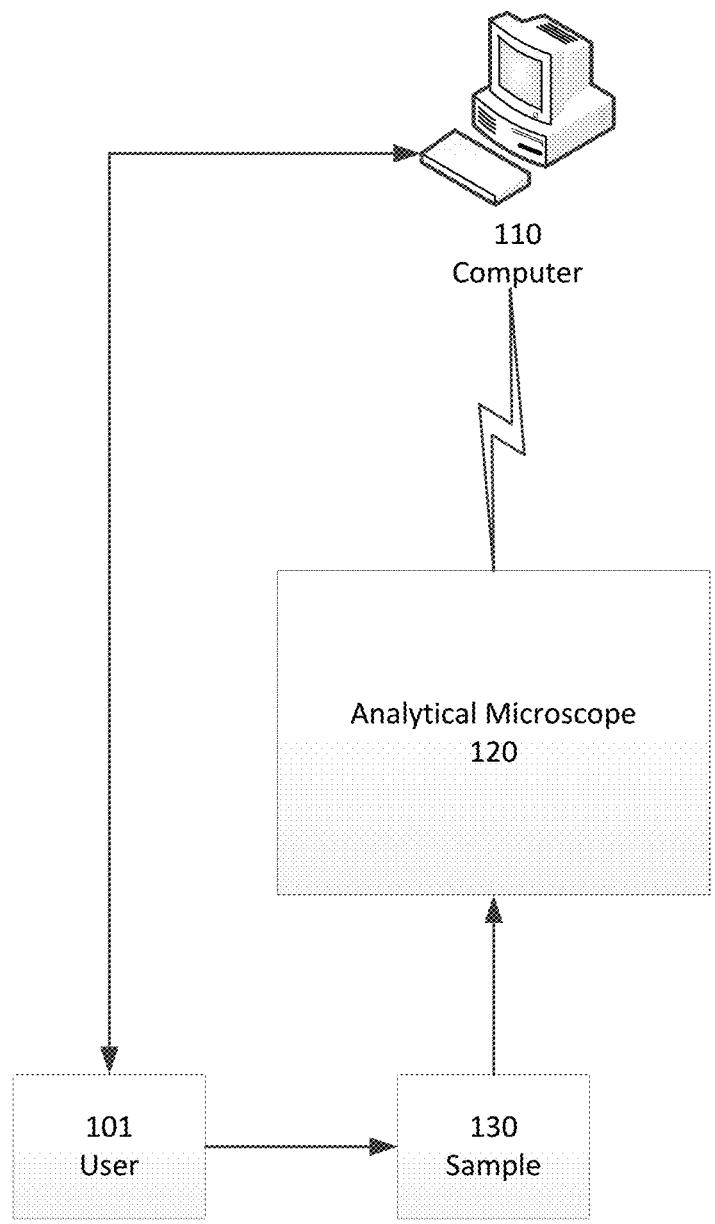
FIG. 1 is a simplified graphical representation of one embodiment of an analytical microscope and associated computer system.

FIG. 1 provides a simplified illustrative example of user 101 capable of interacting with computer 110 and sample 130 (e.g. for loading into analytical microscope 120), as well as a network connection between computer 110 and analytical microscope 120. It will be appreciated that the example of FIG. 1 illustrates a direct network connection between the elements (e.g. including wired or wireless data transmission represented by lightning bolts), however the exemplary network connection also includes indirect communication via other devices (e.g. switches, routers, controllers, computers, etc.) and therefore should not be considered as limiting.

Computer 110 may include any type of computer platform such as a workstation, a personal computer, a tablet, a "smart phone", a server, compute cluster (local or remote), or any other present or future computer or cluster of computers. Computers typically include known components such as one or more processors, an operating system, system memory, memory storage devices, input-output controllers, input-output devices, and display devices. It will also be appreciated that more than one implementation of computer 100 may be used to carry out various operations in different embodiments, and thus the representation of computer 110 in FIG. 1 should not be considered as limiting.

In some embodiments, computer 110 may employ a computer program product comprising a computer usable medium having control logic (computer software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts. Also in the same or other embodiments, computer 110 may employ an internet client that may include specialized software applications enabled to access remote information via a network. A network may include one or more of the many various types of networks well known to those of ordinary skill in the art. For example, a network may include a local or wide area network that employs what is commonly referred to as a TCP/IP protocol suite to communicate. A network may include a network comprising a worldwide system of interconnected computer networks that is commonly referred to as the internet, or could also include various intranet architectures. Those of ordinary skill in the related arts will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

In the embodiments described herein, analytical microscope 120 may include any analytical microscope currently available or that may be available in the future. For example analytical microscope 120 may include an Olympus BX51 microscope that can be equipped with an 0.5× video camera adapter and ¼ inch diagonal CCD video camera (e.g. Sen-Tech STC-C83USB-AT-B) having square pixels measuring 4.65 microns on a side. Also in the described embodiments, stage 210 is motorized and positionally calibrated (e.g. Prior H7550T).

Figure 2:
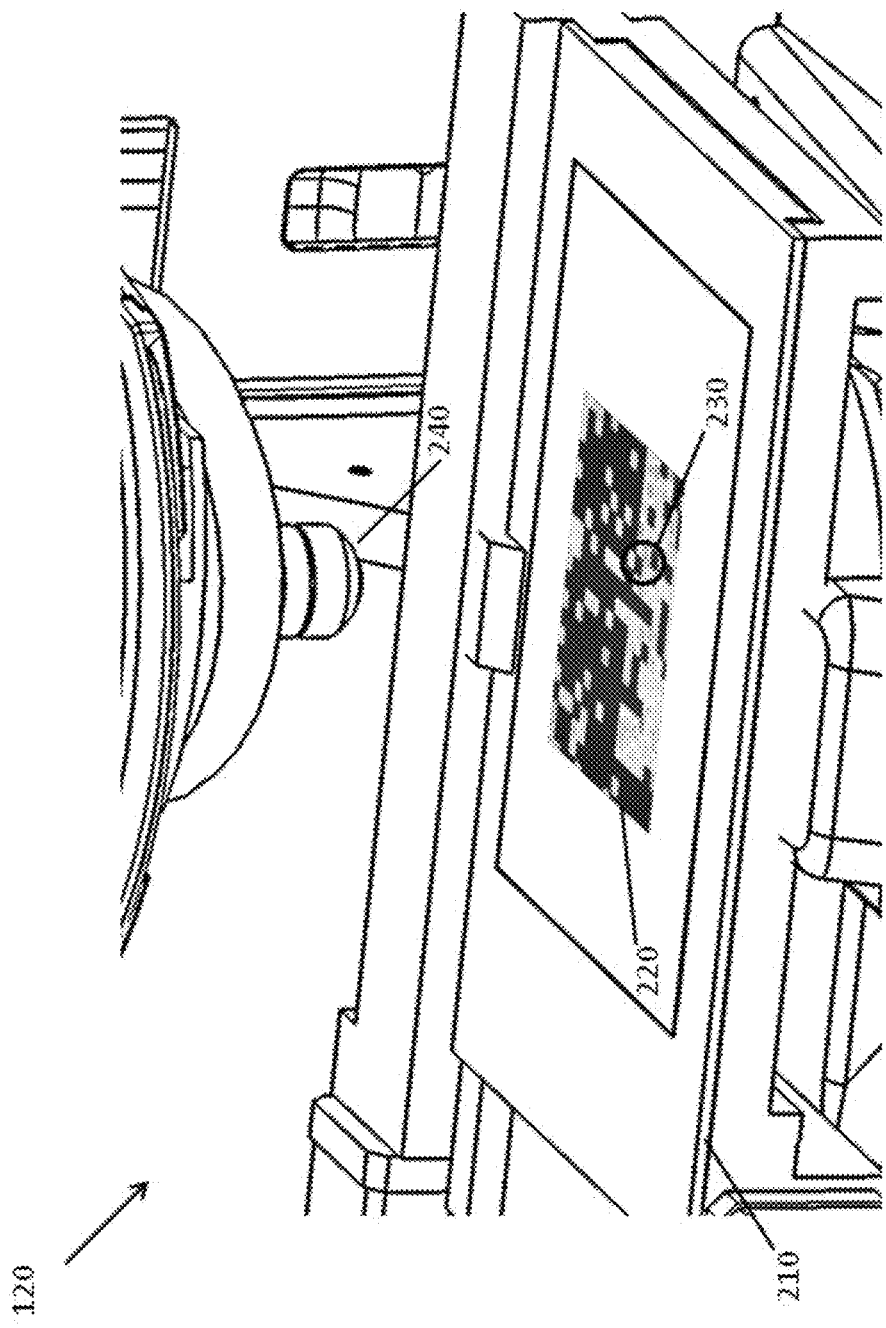
FIG. 2 is a simplified graphical representation of one embodiment of the analytical microscope of FIG. 1 comprising a stage and a calibration element.

In the illustrative example shown in FIG. 2, analytical microscope 120 includes a stage 210 configured for translation over known distances and calibration element 220 disposed on stage 210. In the embodiments described herein stage 210 is motorized and may be under operational control of one or more software and/or firmware embodiments. Further, the translation of stage 210 is precisely calibrated so that the distance of translation is extremely accurate. Embodiments of calibration element 220 may include various physical configurations that include, but are not limited to, unattached elements such as a transparent/opaque slide or "wafer" (e.g. silicon wafer, etc.) configured to couple with stage 210, or elements directly associated with microscope stage 210 (e.g. mounted plate, sticker, printed element, a painted element, etc.). For example, calibration element 220 may be disposed (e.g. printed/painted, embossed, etched, or affixed in some other manner known in the related art) on the bottom surface of a transparent slide so that it can be imaged from above (e.g. the pattern may be imaged through the slide). In some applications the distance between the focal plane of top surface of the slide and the focal plane of the bottom surface of the slide (e.g. due to the thickness of the slide) can be useful. Further, when sample 130 is placed on the top surface of the slide for analysis by analytical microscope 120, one or more regions of calibration element 220 may be visible (e.g. not obscured by sample 130) such that the features of calibration element 220 may, for instance, be employed for real-time analysis during the process of acquiring an image of sample 130. It will also be appreciated that calibration element 220 can be disposed on the top surface of the slide and thus the example should not be considered as limiting.

Embodiments of calibration element 220 comprise a multidimensional, substantially non-periodic pattern 230 comprising features that exhibit contrast when illuminated by a visible light (e.g. may include light comprising a range of wavelengths that is visible to the human eye or may include monochromatic light having a single visible wavelength) beam or an analytical light beam. Embodiments of analytical microscope 120 include one or more optical image detectors that collect images of pattern 230 associated with calibration plate 220 through an embodiment of microscope objective lens 240 typically in response to the visible light (e.g. a video camera). In general embodiments of analytical microscope 120 include multiple embodiments of objective lens 240 (e.g. 2, 4, 6, etc.), each providing a different level of magnification. Importantly, some embodiments of objective lens 240 may provide overlapping fields of view with another embodiment at their respective magnification levels and the combination of all embodiments of objective lens 240 associated with analytical microscope 120 provide a broad range of magnification levels. Further, embodiments of analytical microscope 120 include one or more analytical image detectors that collect images of substantially non-periodic pattern 230 associated with calibration plate 220 through a microscope objective 240 typically in response to the analytical light (e.g. a spectrometer)

Figure 3:
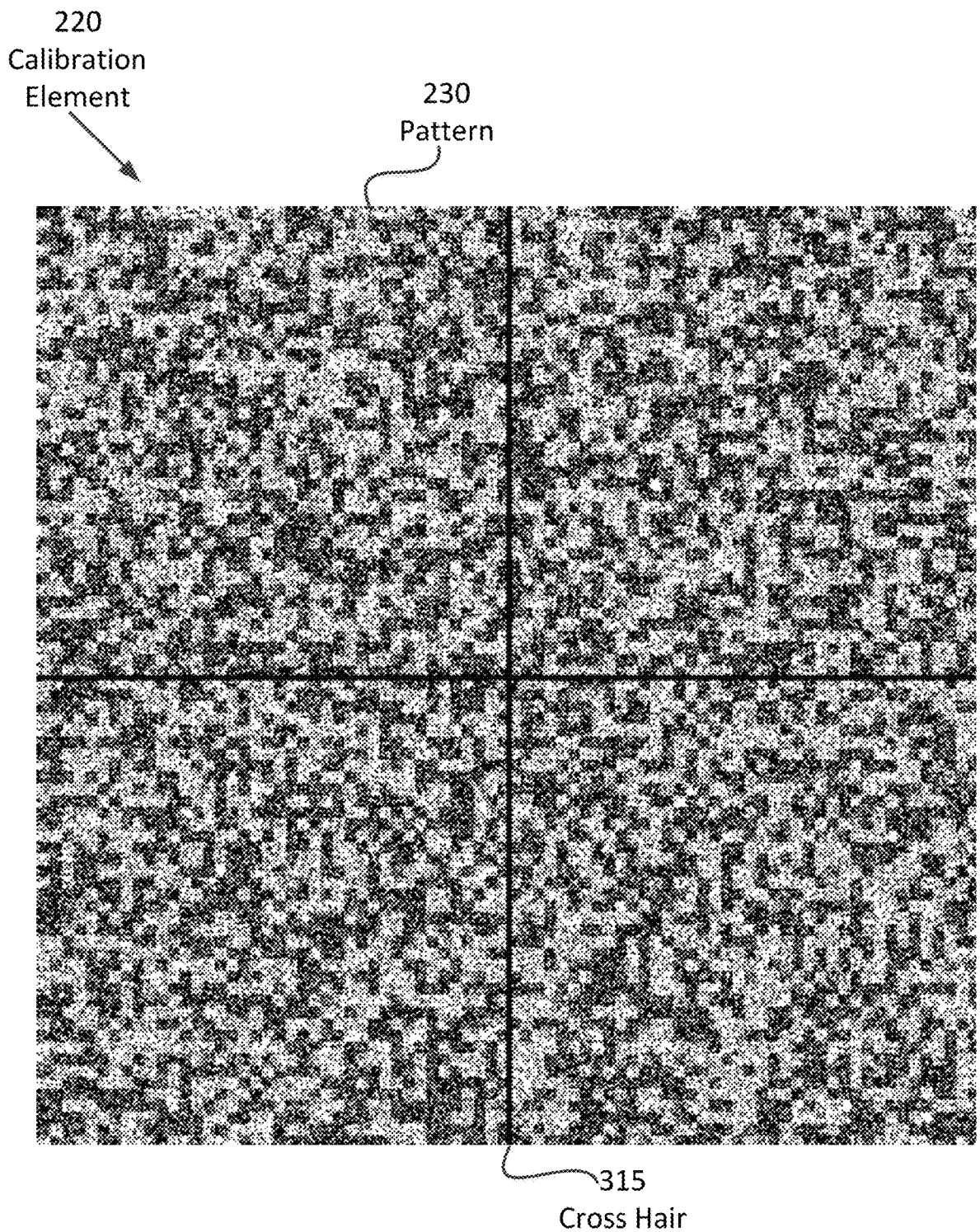
FIG. 3 is an example of one embodiment of the calibration element of FIG. 2.

An exemplary embodiment of calibration element 220 is illustrated in FIG. 3 that includes different features that reflect and absorb wavelengths of light. For example, calibration element 220 comprises pattern 230 that includes multidimensional levels of substantially non-periodic feature structure, where the individual features exhibit contrast when illuminated by a visible light beam or an analytical light beam. The term, "non-periodic" as used herein generally refers to occurrence of a feature type (e.g. light feature type or dark feature type) that does not substantially repeat at regular intervals relative to the other feature type. As described above, any light beam suitable for chemical or material analysis is suitable for the analytical light beam, such as a laser light beam (e.g. typically useful for analysis of Raman scattering), or an infrared light beam. In particular, FIG. 3 shows calibration element 220 that comprises what may be referred to as a coarse feature structure and a fine feature structure each occurring in a substantially non-periodic arrangement. In the described embodiments, pattern 230 can be substantially non-periodic over at least two regions of calibration element 220 associated with the field of view of embodiments of objective lens 240. In some embodiments a first region may comprise a dimension in a range of between 50 and 600 μm (e.g. 500 μm), and the second region may comprise a dimension in a range of between 5 and 60 μm (e.g. 50 μm). For example, the translation distance of stage 210 employed for a region should be large enough so that it travels at least one pixel distance in an image comprising the field of view of objective lens 240 used to acquire the image. Further, the translation distance employed should not exceed about ½ of the total field of view in the image. In the presently described example, the correlation function, described below, may become increasingly less effective when the limits of the range are exceeded.

FIG. 3 also includes cross hair 315 that can be employed as a positional reference associated with calibration element 220. For example, as will be described in more detail below calibration software may use cross hair 315 as a positional reference to determine a region of interest and/or positional location within calibration element 220.

Figure 4A:
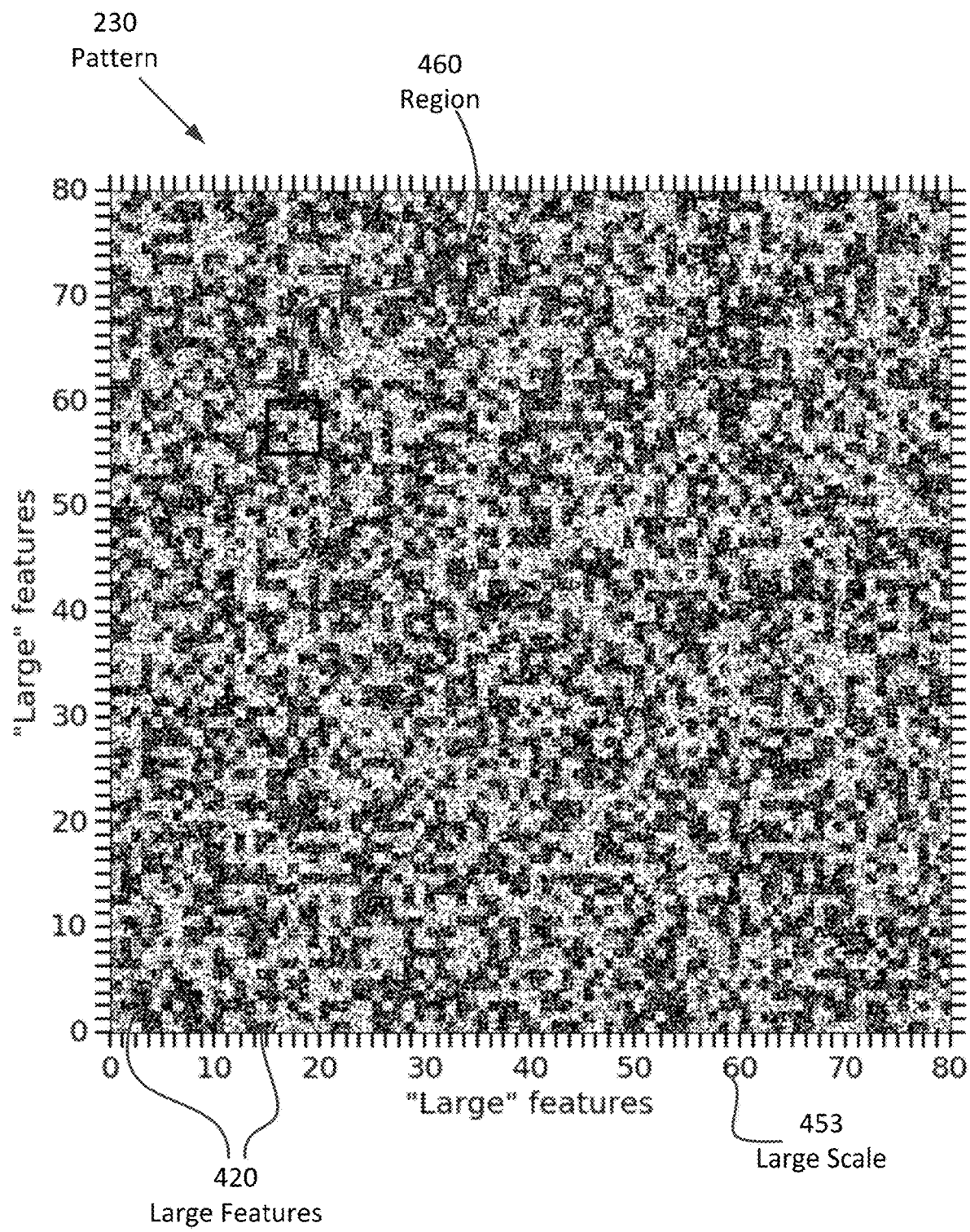
FIGS. 4A and 4B are examples of one embodiment of the calibration element of FIG. 2 illustrating different feature dimensions.

FIG. 4A shows another example of pattern 230 comprising an array of large features 420 that occurs as both substantially square light areas, as well as substantially square dark areas. In some embodiments, the light areas include reflecting structure (e.g. like a mirror) and the dark areas may include absorbing structure (e.g. like a brick wall) or in some embodiments may include transmissive structure (e.g. like a window). FIG. 4A also provides an example of large scale 453 along the edge of pattern 230 that illustrate the boundaries large features 420. For instance, in the embodiment illustrated in the example of FIG. 4A, pattern 230 comprises a square dimension having 80 rows and 80 columns of large features 420. It will, however, be appreciated that pattern 230 may have different numbers of rows and columns depending upon various factors and conditions, and thus the example of FIG. 4A should not be considered as limiting.

It will also be apparent from FIG. 4A that large features 420 comprise a substantially non-periodic structure where, for example light reflecting structure or light absorbing structure in pattern 230 do not exhibit a substantially repeating pattern. Further, in the described embodiments the composition of each of large features 420 is random with an equal probability of having light reflecting structure or light absorbing structure, however it will be appreciated that some degree of periodicity could be tolerated and is considered within the scope of the invention. For example, a degree of periodicity in pattern 230 can result in a number of additional peaks (e.g. in addition to a "maximum" calculated by a cross correlation function as described below). The additional peaks, and thus the degree of periodicity, can be tolerated in certain embodiments so long as the peaks are smaller and dimmer than the peak associated with the calculated maximum (e.g. easily distinguishable from the maximum). Also in the present example, pattern 230 may include some repetition in regions a distance scale away from a region of interest (e.g. comprising two or more fields of view used for a calibration operation). In other words, a region comprising repetition from a first region is separated by a distance that is sufficient such that there is no effect on the calibration operations using multiple fields of view of the first region of pattern 230. It will also be appreciated that in the embodiments described herein, there is consistency in the dimension of large features 420 as well as small features 430, which is also tolerated. However, variation in the dimensions of large features 420 and/or small features 430 could also be employed to further increase the substantially non-periodic nature of pattern 230, and thus is considered within the scope of the described invention.

Figure 4B:
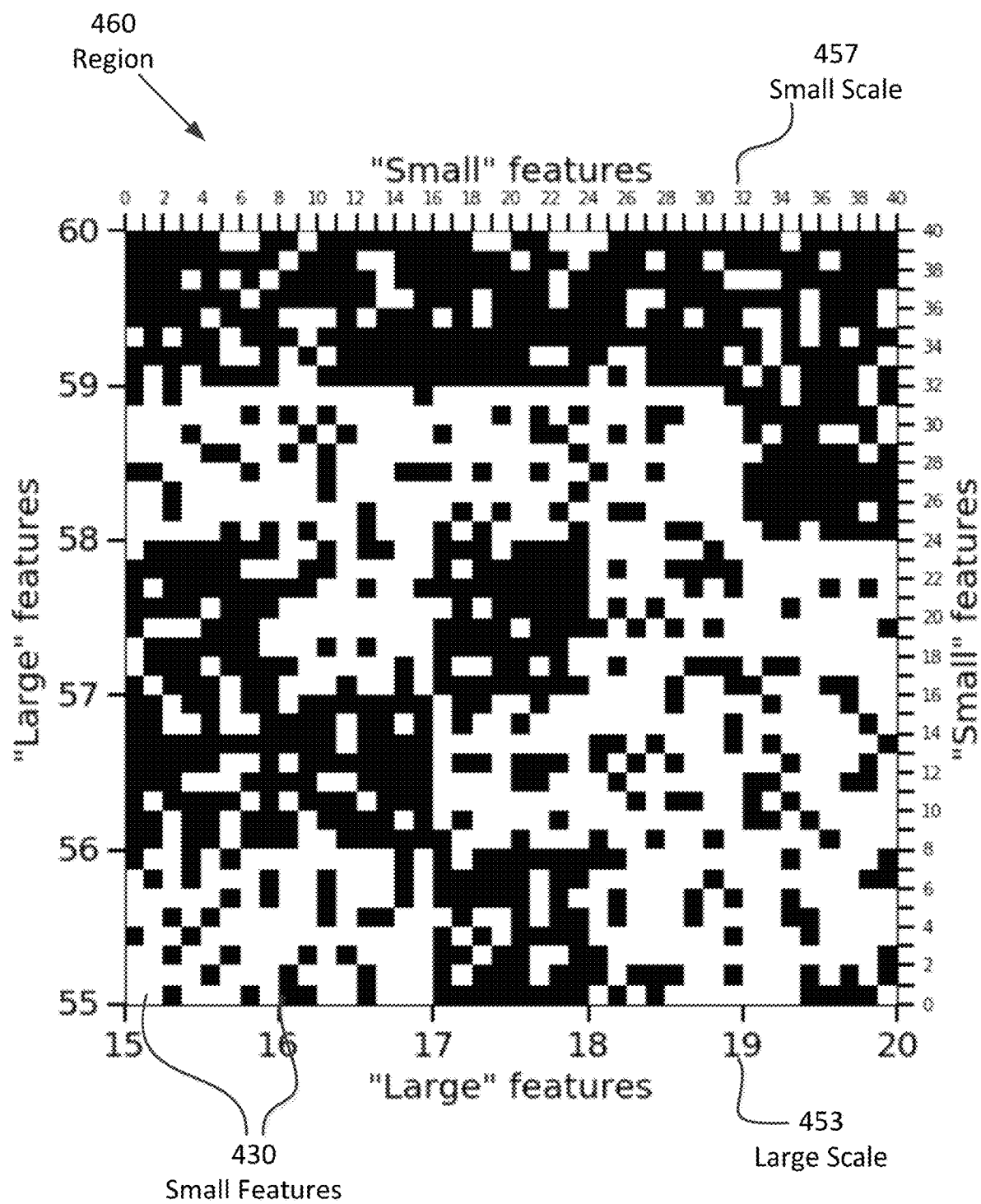

In addition, there is an identifiable fine structure dimension within each of large features 420 visible in FIG. 4A, which is further exemplified in FIG. 4B that provides a magnified view of region 460 of FIG. 4A. The fine structure dimension, as illustrated in the example of FIG. 4B, comprises small features 430, again arranged in a substantially non-periodic pattern of light reflecting structure and light absorbing structure. FIG. 4B also provides an example of small scale 457 an along the edge of region 460 that illustrate the boundaries small features 430 within each occurrence of large feature 420. It will be appreciated that in the substantially light embodiments of large features 420, a substantially light embodiment of small feature 430 occurs at a higher frequency than a dark embodiment although still substantially non-periodic in nature. For example, light embodiment of small feature 430 may occur at about a 75% probability (e.g. >50% and <100%) in the substantially light embodiments of large features 420. Similarly, in the substantially dark embodiments of large features 420, a substantially dark embodiment of small feature 430 occurs at a higher frequency than a light embodiment. Again, in the present example dark embodiments of small feature 430 may occur at about a 75% probability (e.g. >50% and <100%) in the substantially dark embodiments of large features 420.

Continuing with the example of FIG. 4B, each embodiment of small feature 430 may include a square shape of known dimension, although other shapes are possible (e.g. hexagon, etc.). For example, embodiments of small feature 430 should be larger than a pixel associated with a detector embodiment at the highest magnification of analytical microscope 120. Thus, if a pixel at the highest magnification level is about equal to 1 μm of physical distance on calibration element 220, then the dimension of small feature 430 should be larger than 1 μm. Typically, each large feature 420 includes a set number of rows and columns of small features 430. For example, in some embodiments large features 420 may include a square shape comprising 8 rows and 8 columns of small features 430 as can be seen in FIG. 4B (e.g. using scales 453 and 457 as a reference). Again, large feature 420 may have different numbers of rows and columns depending upon various factors and conditions, and thus the example of FIG. 4B should not be considered as limiting In the embodiments described herein a software program may be employed to generate pattern 230 of calibration element 220. For example, the software program could be run on computer 110 associated with analytical microscope 120, or any other computer, and can be configured to change parameters so that each run of the program produces a different configuration of pattern 230. For example the software program may employ a "re-seeding" approach of a random number generator to produce unique feature configurations for pattern 230.

Also, the individual features in pattern 230 should be appropriately dimensioned so that there are at least 3 clearly distinguishable features (e.g. large features 430 or small features 420) in the field of view of an image taken from calibration element 220 at each of the magnification levels of the embodiments of objective 240 associated with analytical microscope 120. Therefore, the multidimensional aspect of pattern 230 on calibration element 220 provides a distinct advantage over standard reticle embodiments. Importantly, the substantially non-periodic multidimensional structure of pattern 230 supports the calibration and alignment processes described herein across a broad range of magnification levels. For example, a single embodiment of calibration element 220 can be used across about a 38:1 range. In the present example, that range may include magnification levels provided by 4×, 100×, and 150× objective lenses that may be employed with analytical microscope 120, however it will be appreciated that other combinations and ranges provided by embodiments of objective 240 may also be used. Also, the calibration software may use large features 420, small features 430, or both to perform various calibration operations.

In some embodiments, contrast can be exhibited in reflection of a visible light beam or an analytical light beam. In the described embodiments, the non-periodic multidimensional pattern of calibration element 220 include features that reflect both a visible light beam and an analytical light beam (e.g. metal-coated features), as well as features that absorb both a visible light beam and an analytical light beam (e.g. black-chrome-coated features, or photoresist-coated features). For example, pattern 230 of calibration element 220 can be fabricated as a pattern of black-chrome-coated features on fused silica. In the present example, calibration element 220 may include a square dimension of about 3.2 mm on a side, and pattern 230 may comprise large features 420 of about 40 μm on a side and the small features 430 of about 8 μm on a side. Importantly, in some embodiments it is not necessary to calibrate the dimensions of the individual features of pattern 230 for absolute accuracy of physical distances. For example, embodiments of motorized stage 210 are typically calibrated to provide precise movement and position. Thus, the multidimensional scale of pattern 230 enables accurate calculation of any magnification level employed by analytical microscope 120 by use of the measured number of pixels between reference points (e.g. features 420 and/or 430) in an image with the actual physical distance traveled (e.g. exact distance of translation from stage 210). By knowing the ratio of 1 μm/pixel physical distance for each embodiment of objective lens 240 the magnification level is easily calculated and does not require knowledge of the exact physical dimensions of the features associated with pattern 230.

Figure 5:
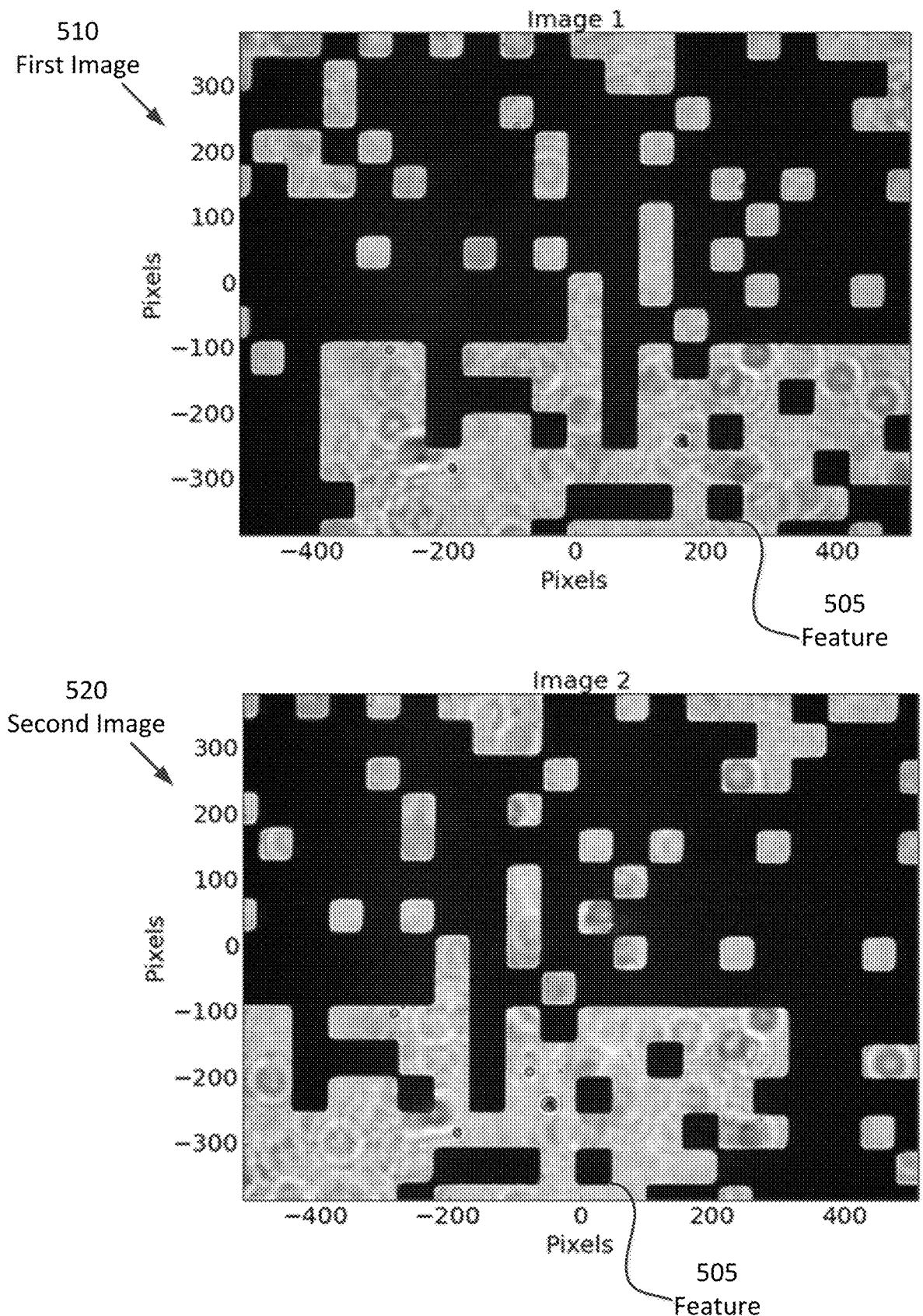
FIG. 5 is an example of two images of a pattern of the calibration element of FIG. 2 shifted by some degree relative to each other.

As described above computer 110 includes a processor and software stored for execution thereon. Embodiments of the presently described invention include one or more software applications configured to determine a shift in physical distance of calibration element 220 as well as the magnification level of objective lens 240 based on correlation of two or more images of pattern 230 before and after translation of calibration element 220 by some distance. For example, in some embodiments a software application performs an image shift analysis includes comparing the relative positions of features in two images where the positions of the features associated with calibration element 220 in the second image has been changed by some degree from the position in the first image. FIG. 5 provides an illustrative example of first image 510 and second image 520 each comprising an image of feature 505 (e.g. an embodiment of small feature 430) within the field of view. In the present example, the left edge of feature 505 is located at about the +200 pixel position on the x-axis in first image 510, relative to a location of the left edge of feature 505 at about the 0 pixel position on the x-axis in second image 520. It will be appreciated that the direction (e.g. X/Y; +/−) and magnitude of shift may vary, and thus FIG. 5 should not be considered as limiting.

In some or all of the embodiments described herein, the calibration of stage 210 is trusted as a dimensional reference. In some embodiments, the image shift can be up to about 50% of the field-of-view of the image at a particular magnification in either the X or Y axis, and the minimum image shift may include a fraction of a pixel (e.g., ½, ⅓, or ¼ of a pixel). Finding the magnitude of the image shift in units of pixels may be performed using various approaches such as, for example, by cross correlation function as described below. Also in the described embodiments, a second shift can be made in a second axis (e.g. first shift in X axis and second shift in Y axis), that enables a separate calibration for each axis. For instance, this approach is useful for video cameras that do not have a square pixel shape.

Figure 6A:
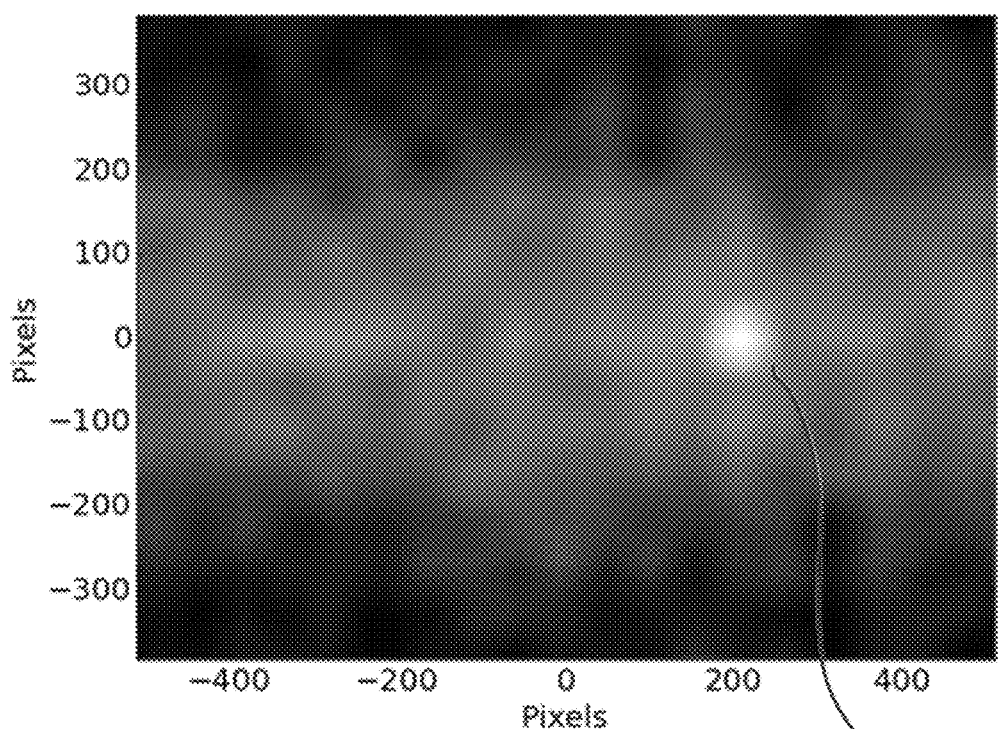
FIGS. 6A and 6B are examples of one embodiment of the results of a cross correlation function that identify the degree of shift of FIG. 5.
Figure 6B:
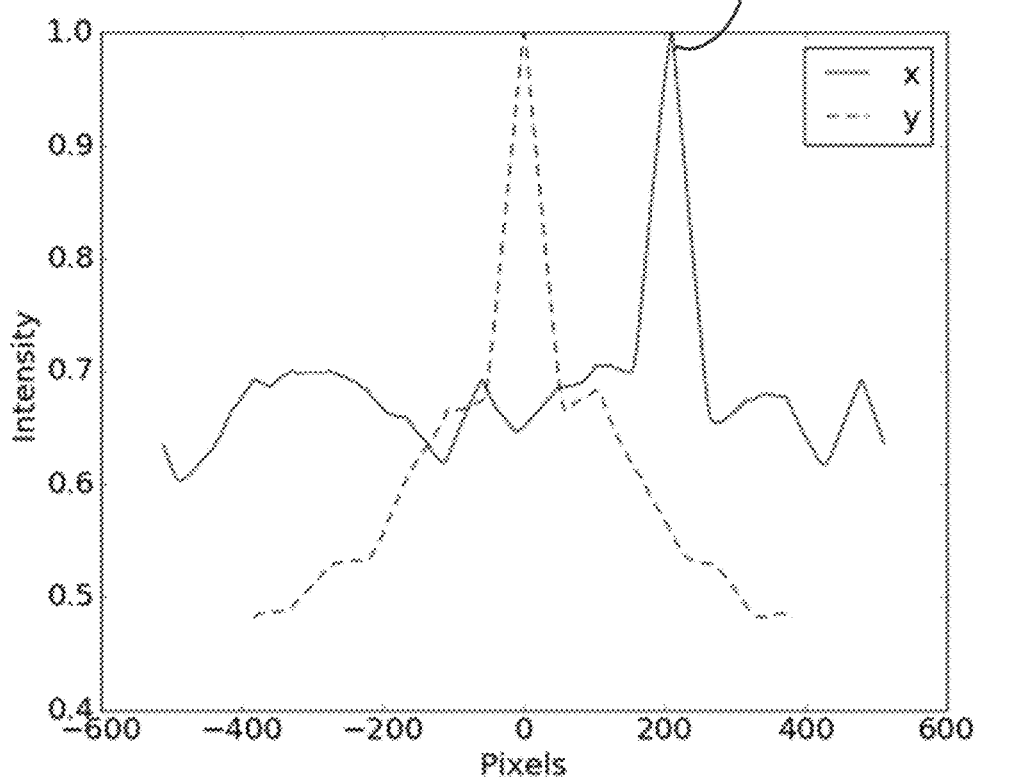

For example, using two images g1 and g2 that include features displaced relative to one another in the x and/or y directions between the images, the Fourier correlation function C is:

$$C = \|F{-}1(F(g1)(g2)^*)\| \qquad \text{Eq. 1}$$

where:
g1 and g2 comprise 2-dimensional pixel arrays g1(x,y) and g2(x,y);
F(g) is the 2-dimensional Fourier transform;
F−1(G) is the 2-d inverse Fourier transform;
* is the complex conjugate; and
‖g‖ is the absolute value FIG. 6A provides an illustrative example of calculated maximum 610 (e.g. bright spot corresponds to the maximum of the cross correlation function) located at a position (x,y) in an image that is equal to the displacement in pixels between the features in first image 510 relative to second image 520. As described herein, it is advantageous that pattern 230 is substantially non-periodic to insure that there is only one maximum of the cross correlation function as a result. FIG. 6B further demonstrates the horizontal and vertical profiles of the peak associated with calculated maximum 610 along with the precisely computed shift values. In the present example, FIG. 6B demonstrates an image shift of 0.73 vertical pixels and 209.67 horizontal pixels. It is important to note that in the present example the computed shift values in pixels are resolved to less than one pixel which are then converted to a physical distance measure that in the present example includes a horizontal shift of 10 μm on the horizontal stage. The unintended small vertical shift in the images of less than one pixel is attributable to the rotation of the video camera around the optical axis of analytical microscope 120 relative to the coordinate axes of the stage that occurred between the acquisition of the first image and the acquisition of the second image. The ability to discern this rotation is a beneficial and important feature of the automated system. It will also be appreciated that some rotation of pattern 230 between images is possible (e.g. error with stage translation, user intervention, etc.) where the rotation is similarly identified.

As described above, the software application may compute a magnification level of microscope objective lens 240. For example after computing the cross correlation function the software executes an operation that multiplies the computed shift in number of pixels (e.g. from the cross correlation function) by the camera pixel size (e.g. in μm/pixel units), and divide the result by the actual translation distance of calibration element 220 on stage 210 (e.g. in μm units), the result of which is then divided by any camera relay lens magnification (e.g. a lens or lens group that inverts an image and extends an optical tube). Continuing with the example from FIGS. 5, 6A, and 6B the calculated magnification level of objective 240 is:

(209.67*4.65)/10/1=97.49

Continuing with the present example, the software may then identify objective lens 240 in analytical microscope 120 based on a closest match between the calculated magnification level and an embodiment of objective 240 listed in a table that provides a magnification level for each of the embodiments of objective 240 in the list. In this example the software identifies objective 240 as a 100× embodiment of objective 240 installed in analytical microscope 120. This can be important in embodiments of analytical microscope 120 that utilizes an auto focus routine, where an incorrect identification of objective 240 can lead to use of incorrect parameters (e.g. based on characteristics of the different embodiments of objective 240). In some cases this can produce a disastrous result where damage may occur to one or more components (e.g. objective 240, microscope stage 210, calibration element 220) by colliding objective 240 with stage 210 in an attempt to focus an image using the wrong parameter.

Figure 7:
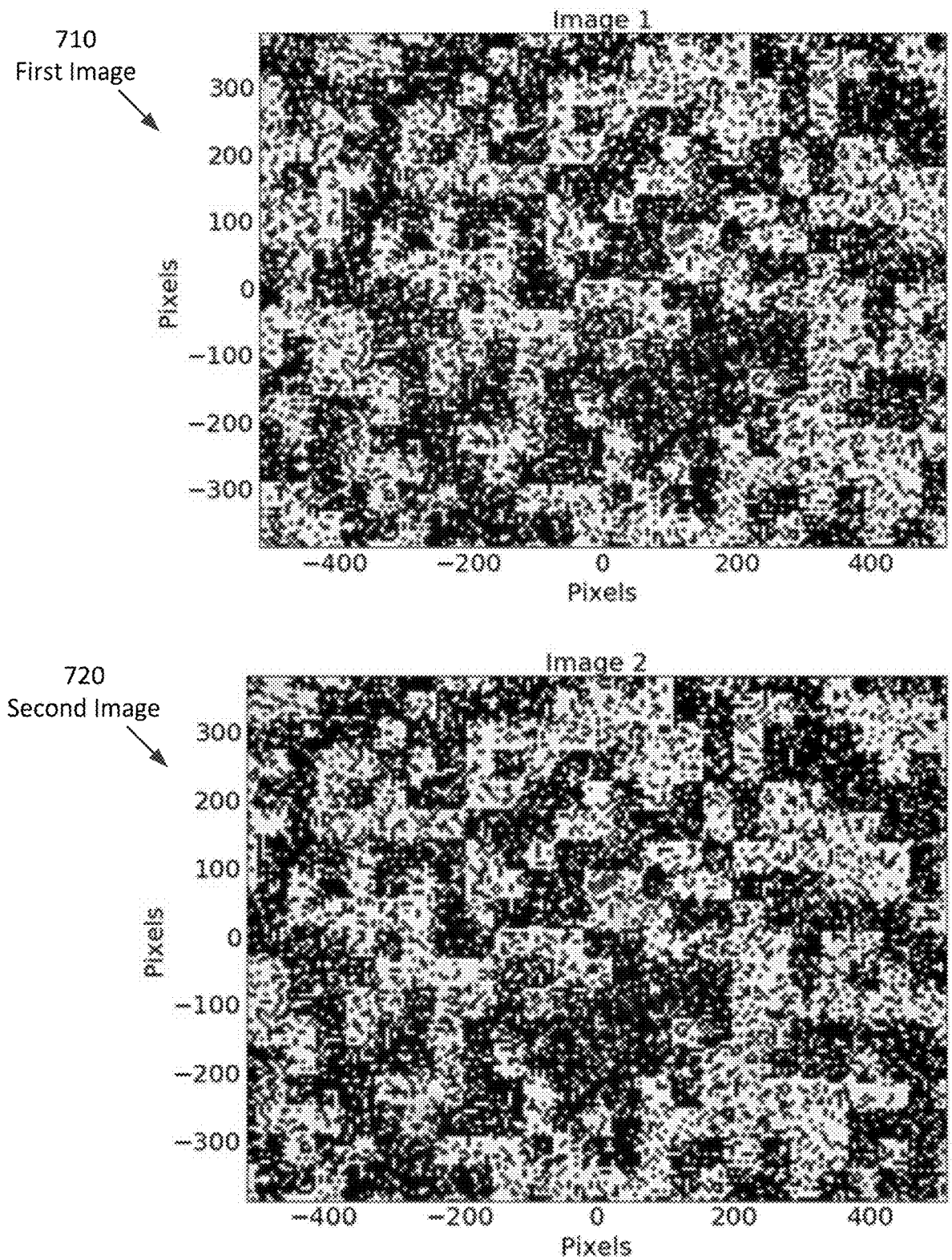
FIG. 7 is an example of two images of a pattern of the calibration element of FIG. 2 shifted by some degree relative to each other.
Figure 8A:
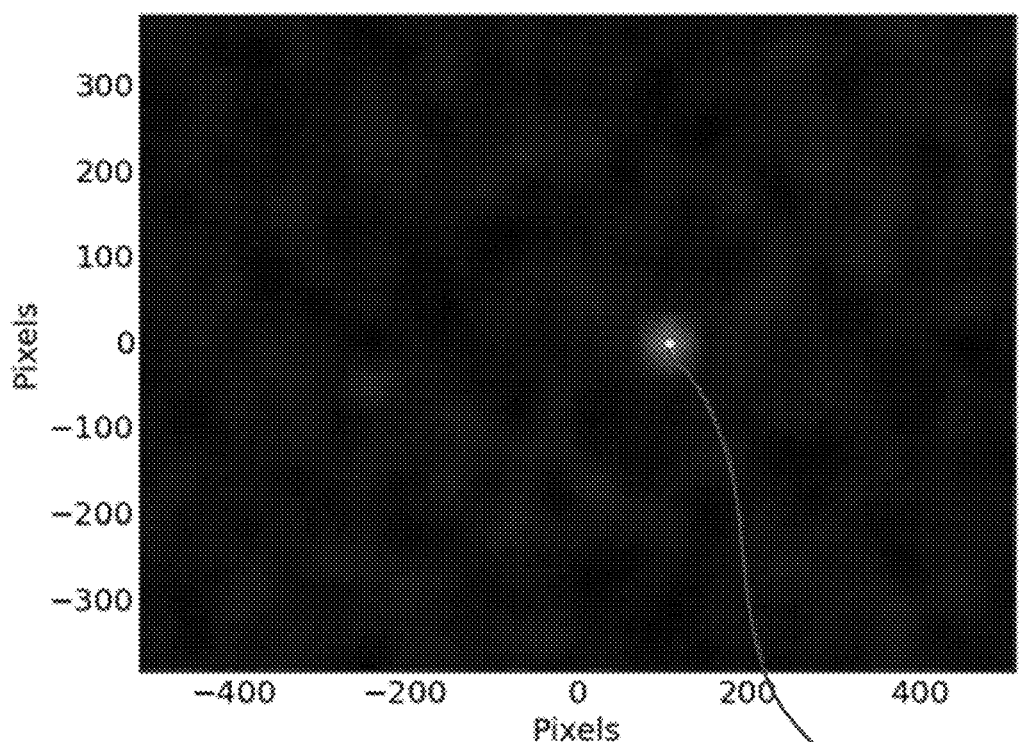
FIGS. 8A and 8B are examples of one embodiment of the results of a cross correlation function that identify the degree of shift of FIG. 7.
Figure 8B:
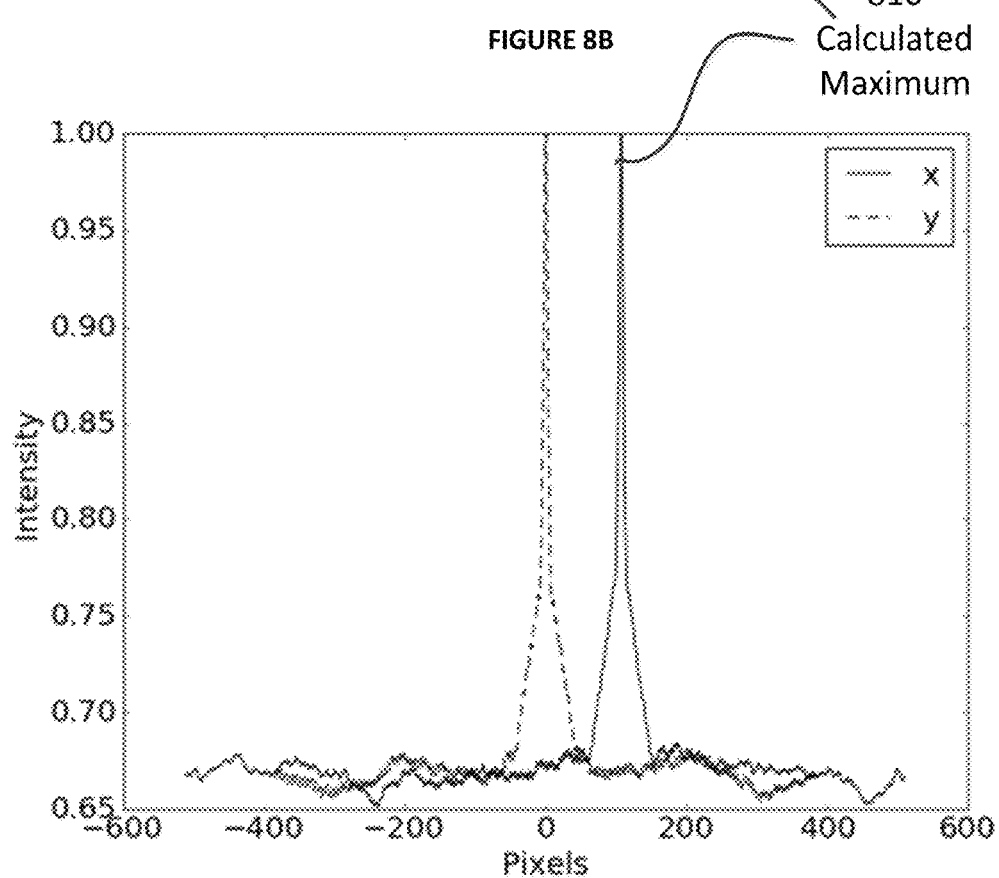

In separate example, an embodiment of objective 240 comprising a 10× magnification level and a 0.5× camera relay lens magnification was used to capture first image 710 of calibration element 220, translate calibration element 220 by 100 μm of physical distance, and subsequently capture second image 720 of calibration element 220 as provided in the example of FIG. 7. In the present example, the software application used large features 420 to compute maximum 810 that includes an image shift of 0.565 vertical pixels and 108.056 horizontal pixels of image 710 relative to image 720, as demonstrated in FIGS. 8A and 8B. Therefore, in the present example the software application calculates magnification level of objective 240 as:

(108.056*4.65)/100/0.5=10.05

Further, as described herein some embodiments of analytical microscope 120 can include one or more elements that provide an analytical light beam and associated detection elements such as a spectrometer that collects analytical images of the calibration element 220 through objective 240. In some or all of the described embodiments, the software application can use the analytical images in the same manner as the methods for computing shift as described for optical images above. In addition, the software application can use a combination of an optical image and an analytical image using the same embodiment of calibration element 220. For example, using the methods described herein the software application computes shift values to measure the relative alignment between a video camera and a spectroscopic detector that is then used to align the two detectors, either by mechanically aligning them, or by reprocessing the images in software. This is important because the video image is often used to identify points of interest on sample 130 for spectral analysis. Also, good registration provides user 101 with confidence that the spectral measurements faithfully represent the spatial features of sample 130.

Figure 9:
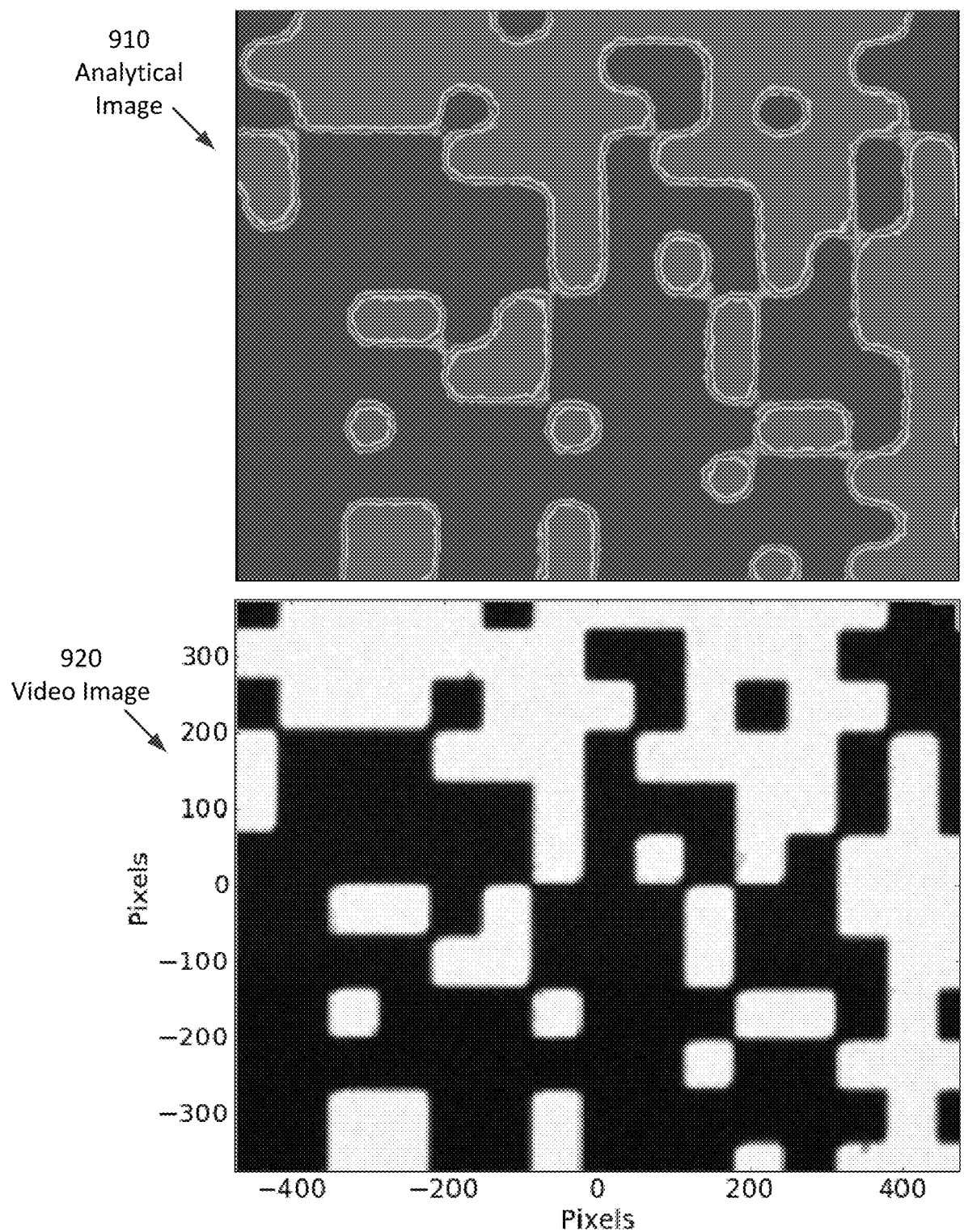
FIG. 9 is an example of an optical image and an analytical image of a pattern of the calibration element of FIG. 2.
Figure 10A:
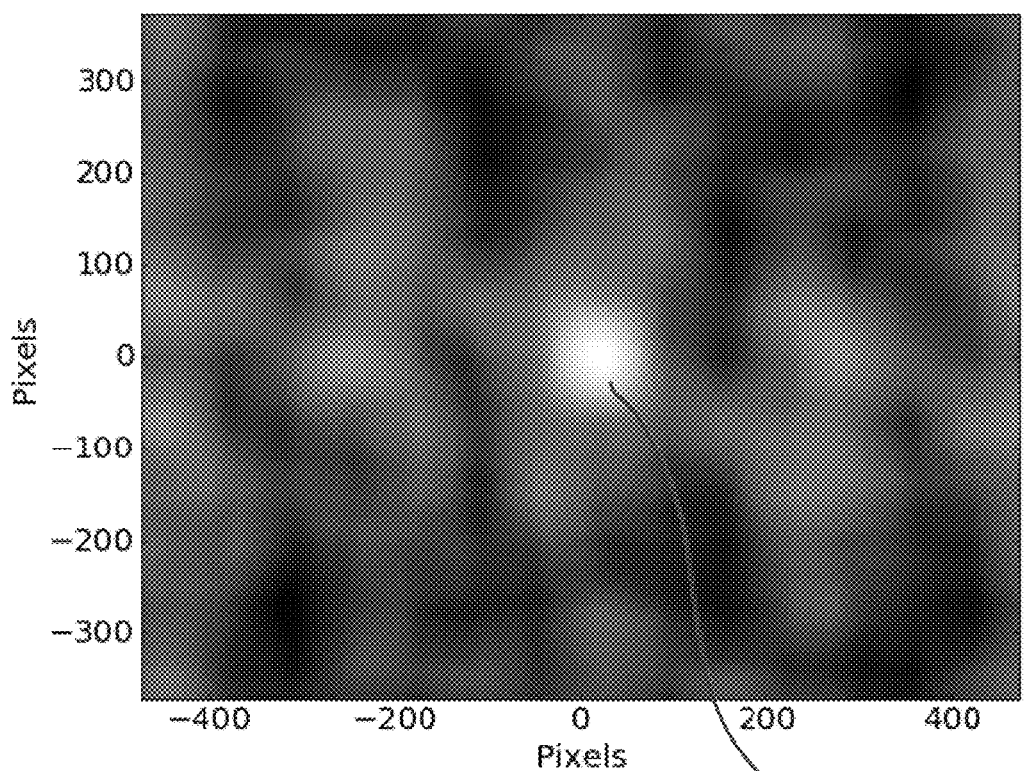
FIGS. 10A and 10B are examples of one embodiment of the results of a cross correlation function that identify a degree of shift between detectors that acquired the images of FIG. 9.
Figure 10B:
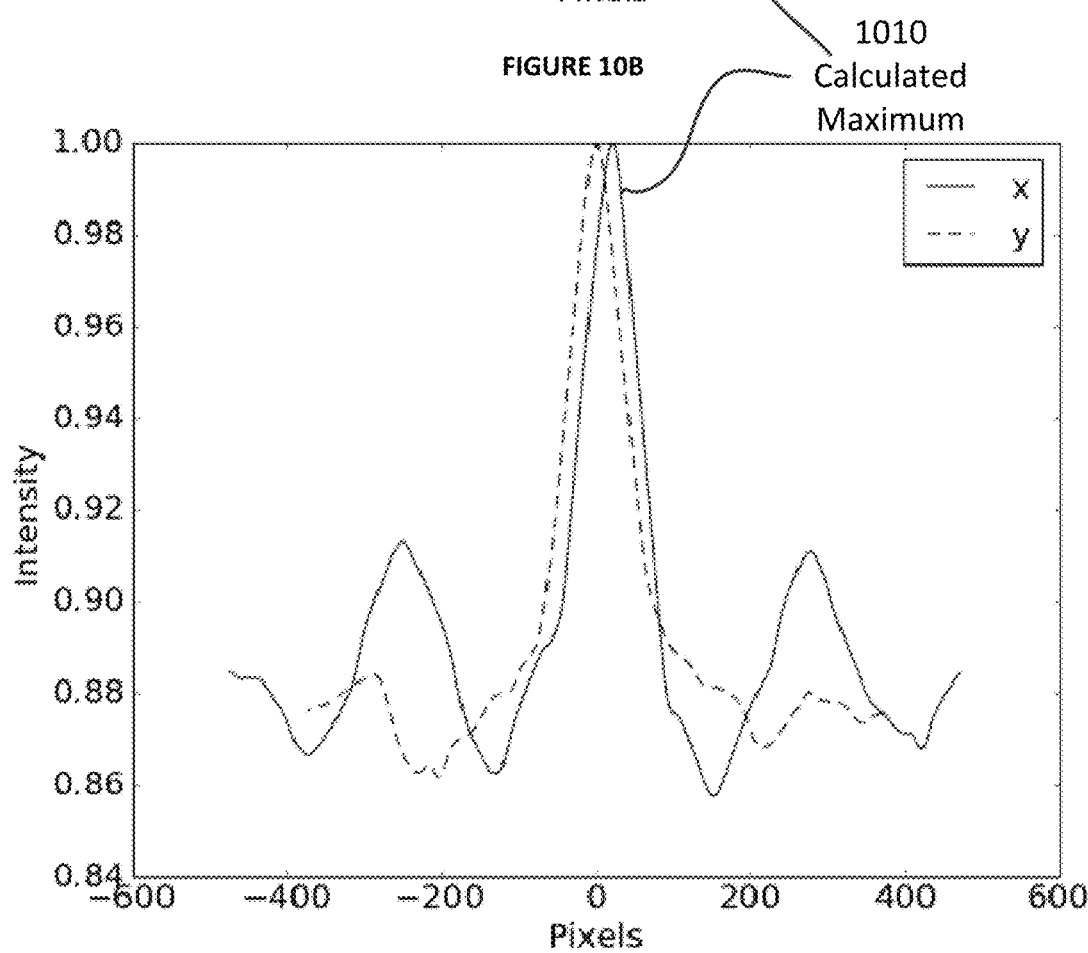

FIG. 9 provides an illustrative example of analytical image 910 and video image 920 both taken from about the same region of calibration element 220. The illumination of calibration element 220 was provided from below and the spectrometer collected the transmitted light through objective 240 using a 50× magnification level (e.g. using about a 2 μm spot size). The software application then calculated a "chemigram", which is a spectral image representing the total intensity of light collected at each spot. In the present example, the spectrometer has limited spatial resolution when compared to the video image that results in a rough appearance of analytical image 910. Despite that appearance the image shift calculation was relatively unaffected as illustrated in the example of FIGS. 10A and 10B that shows calculated maximum 1010. Therefore, as the example provided in FIGS. 10A and 10B demonstrates despite the fact that the two images were collected in different ways, and at different levels of resolution and noise, the software application accurately reported a vertical shift of 0.31 pixels and a horizontal shift of 22.05 pixels.

Figure 11A:
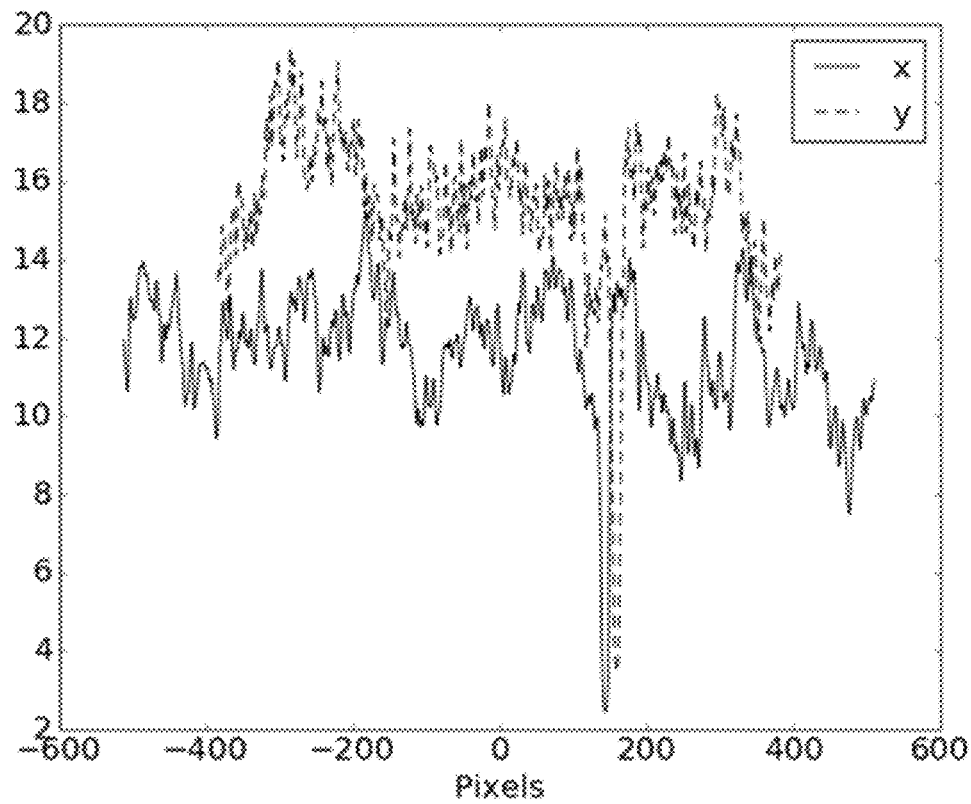
FIGS. 11A and 11B are examples of one embodiment of the results of a function that identifies the location of a cross hair element.
Figure 11B:
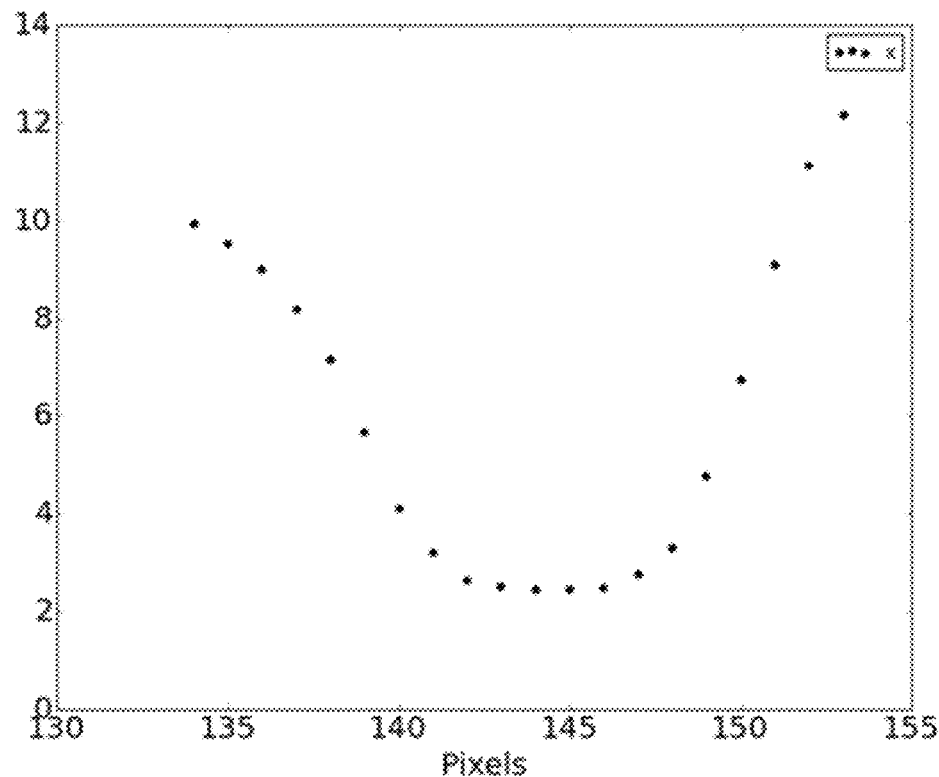

Also, as described above the described embodiments include an ability to determine an absolute position of calibration plate 220 relative to objective 240, and in some cases the position of stage 210. For example, the position of the cross-hair 315, as illustrated in FIG. 3, may be represented by a "dip" in a field of intensity values in an optical image. In some cases this can include approximately a 50% difference in contrast across the pattern 230 that can be identified by the software application. For example, the software application my sum the field intensity values along the X axis (e.g. horizontal direction) and the Y axis (e.g. vertical direction) to generate a profile, such as the type illustrated in FIG. 11A. The software may further analyze the profile to identify the centroid of each dip that can be measured to within a fraction of a pixel, as illustrated for the X axis in FIG. 11B. In the present example, the centroid of the X axis or Y axis may be located some distance away from the Zero (e.g. 0) position representing the location of cross hair 315 in the image. For instance, the vertical distance of cross hair 315 from zero for the X axis and the horizontal distance of cross hair 315 from zero for the Y axis in number of pixels. The software application may then shift the position of calibration element 220 by some desired degree using stage 210 to align the field of view of objective 240 with a desired location.

In some embodiments, cross hair 315 can be used to find what may be referred to as a "home" position. For example, an embodiment of objective 240 having a low magnification level may be used so that cross hair 315 is in the field of view (e.g. stage 210 may also be translated in one or more directions). The video scale (pixels per unit distance) is calibrated using the cross correlation method as described above and the position of the cross-hair is determined from the centroid of the "dip" in the image. Stage 210 is then moved to a position where the cross-hair 315 is centered in the video image, and the position of stage 210 is recorded as the "home" position. In the same or alternative embodiments, cross hair 315 can be used to find a different "home" position for each embodiment of objective 240. For example, some embodiments of objective 240 may be identified as "parcentric" (e.g. not exactly concentric with each other, but simply assure that the objectives 240 share a portion of their fields-of-view). Cross-hair 315 can be used to determine a separate "home" position for each objective so that the focal spot for each objective 240 is located at the same position, thus allowing for automated removal of the centering error. In some embodiments, an X/Y offset value may be pre-calculated for each objective 240 and used in image processing for the specific characteristics of the lens. Further, if parcentricity errors occur through the movement of embodiments of objective lens 240 such that the focal spot for the same embodiment of objective lens 240 does not repeatedly return the same position, then pattern 230 may be used to dynamically calculate an offset value each time there is a change of objective lens 240.

Figure 12:
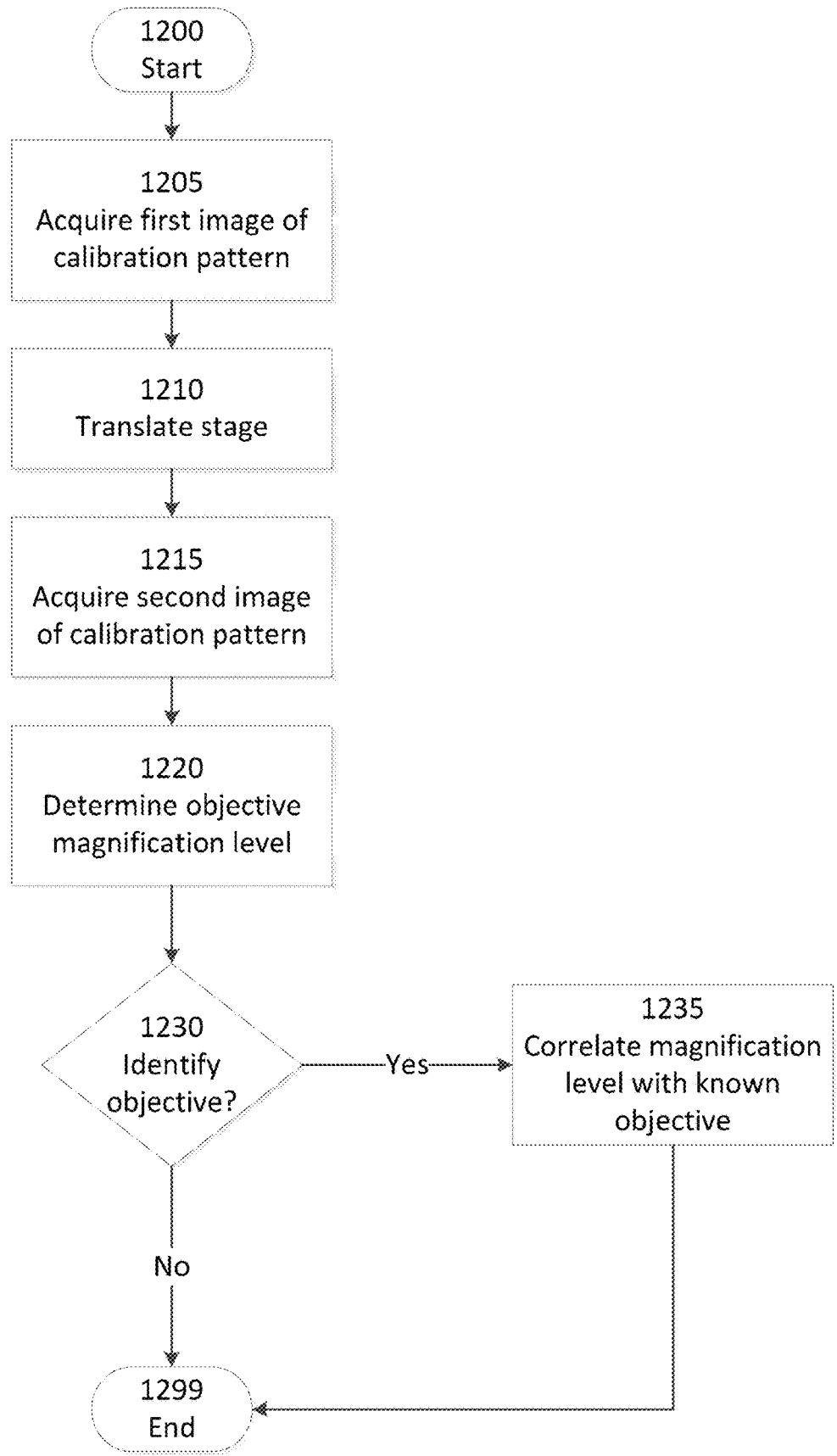
FIG. 12 is a functional block diagram of one embodiment of a method for determining a magnification level.

FIG. 12 provides an illustrative example of a method for determining the level of magnification for objective 240 that begins at step 1200 with calibration element 220 disposed on stage 210. At step 1205 an image (e.g. optical or analytical) is acquired of pattern 230 from a region of calibration element 220 (e.g. region depends upon the field of view of objective 240), stage 210 is translated by some degree in the X and/or Y axis at step 1210, and acquiring a second image (e.g. optical or analytical) of pattern 230 at a second region of calibration element 220 at step 1215. Then at step 1220 the magnification level of objective 240 is determined by correlating aspects of pattern 230 in the first and second images as described above. If there is a desire to identify the objective 240, as illustrated at decision element 1230, then the embodiment of objective 240 that is the closest match between the determined magnification level and the known magnifications of the embodiments of objective 240 associated with analytical microscope 120 is selected and the method ends at step 1299.

FIG. 13 also provides an illustrative example of a method for determining a degree of shift between and optical image and an analytical image that begins at step 1300 with calibration element 220 disposed on stage 210. At step 1305 an optical image is acquired of pattern 230 from a region of calibration element 220 (e.g. region depends upon the field of view of objective 240), and an analytical image of pattern 230 at the same region of calibration element 220 is acquired at step 1315. Then at step 1320 the degree of shift is determined by correlating aspects of pattern 230 in the optical and analytical images as described above and the method ends at step 1399.

EXAMPLES

Figure 14A:
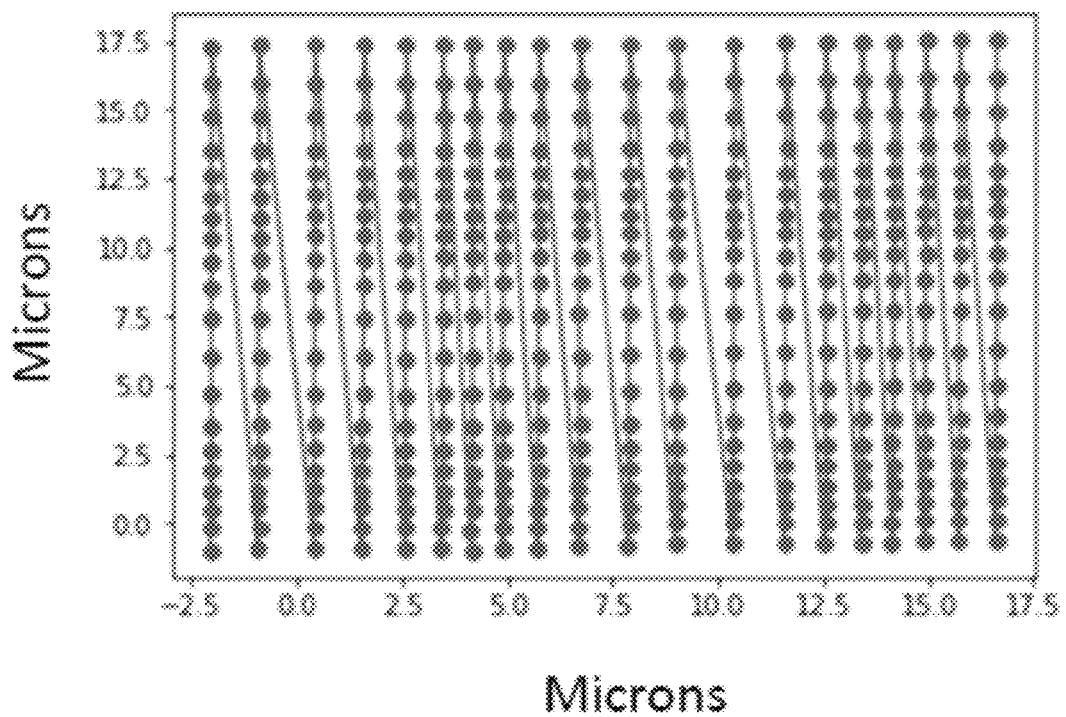
FIG. 14A is an example of one embodiment of data points of representing the position of a sample stage after translation.
Figure 14B:
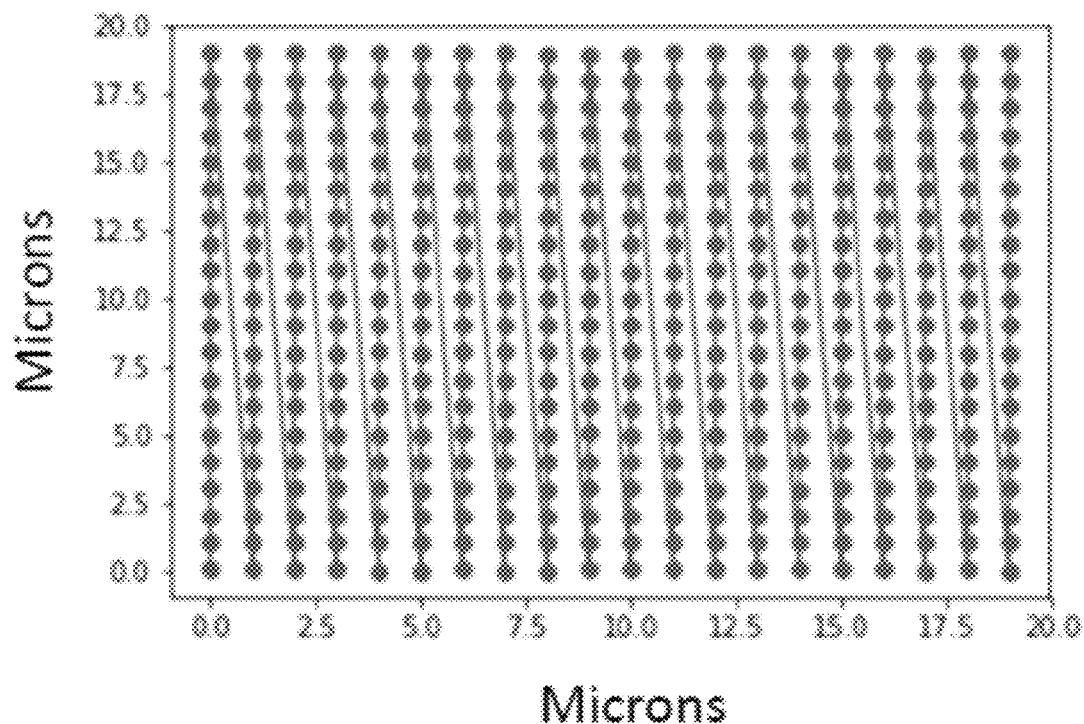
FIG. 14B is an example of one embodiment of data points of representing the position of a sample stage after translation using a position encoder.

In some embodiments analytical microscope 120 may employ one or more "position encoders" (also sometimes referred to as a "position sensor") to control the drive error to zero with embodiments of motor used to translate the position of stage 210 (e.g. a stepper motor). For example, FIG. 14A illustrates the data points of representing the position of stage 210 after translation using a stepper motor that moves stage 210 by a set number of "steps". It can be easily seen that there is a high degree of variability in the distance between positions that is remedied by the position encoder as illustrated in the data points illustrated in FIG. 14B.

Figure 15A:
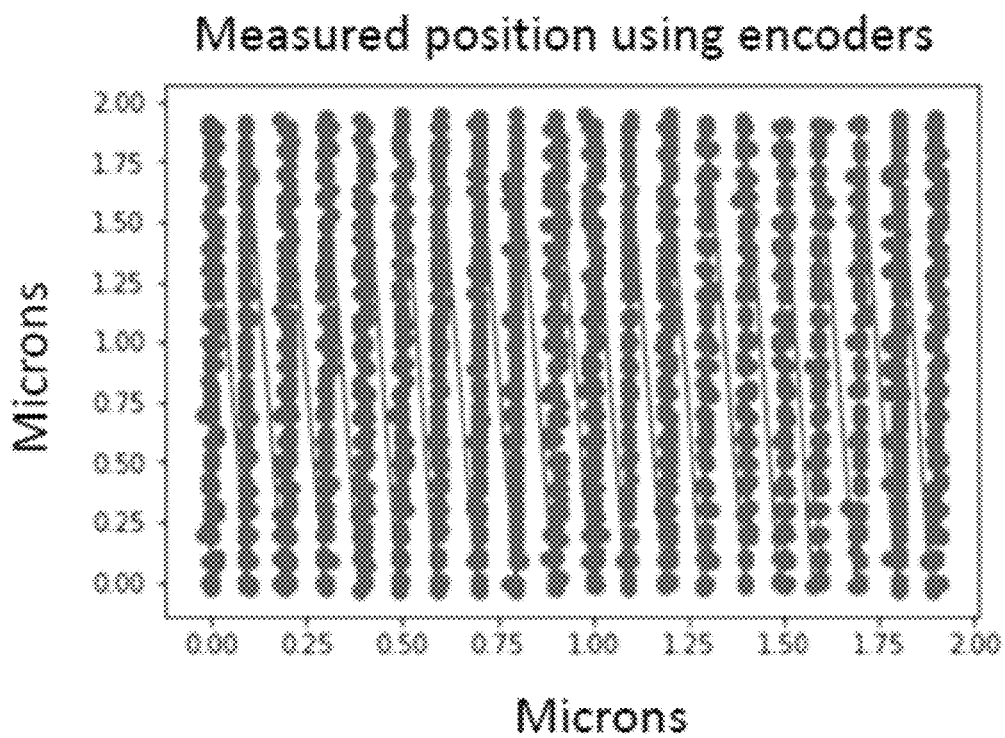
FIG. 15A is an example of one embodiment of data points of representing the position of a sample stage after translation using a position encoder.
Figure 15B:
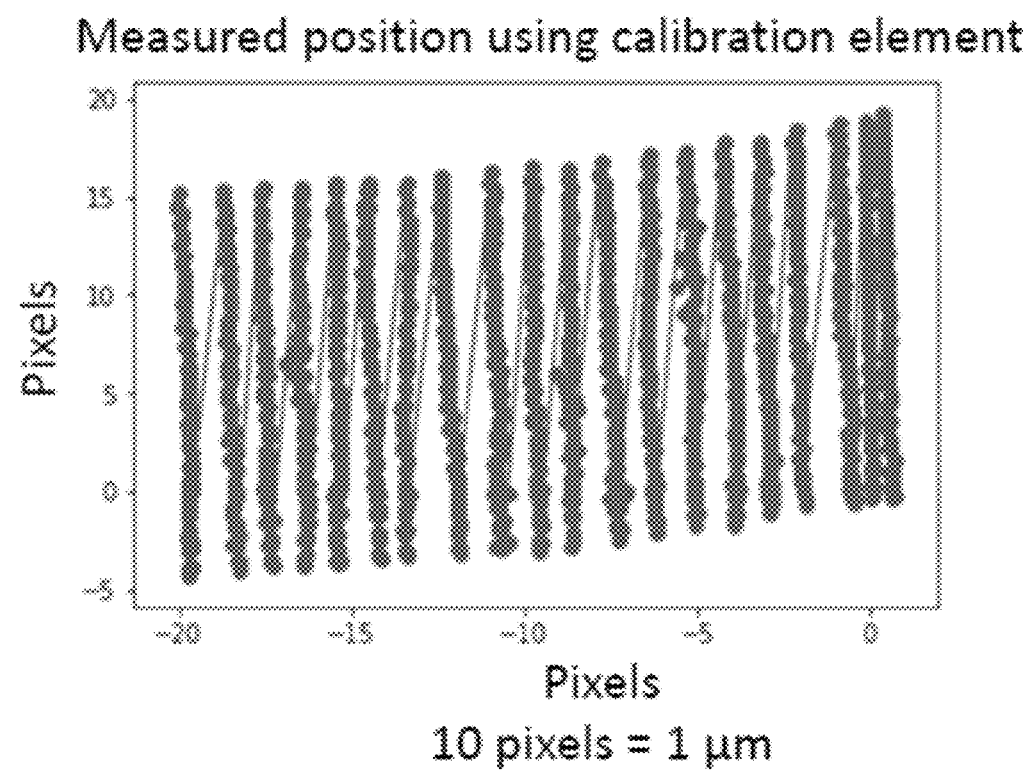
FIG. 15B is an example of one embodiment of data points of representing the position of a sample stage after translation using a position encoder and calibration element.

However, even with the use of position encoders stage 210 is vulnerable to conditions that can significantly affect the accuracy of stage position, even when the encoder indicates that stage 210 is in the correct position. For example, FIG. 15A illustrates the data points obtained from the position of stage 210 when using position encoders. However due to the "thermal drift" caused by a temperature change, the actual position of stage 210 can vary significantly. FIG. 15B illustrates the data points for the same stage positions as illustrated in FIG. 15A measured using calibration element 220. It can be readily seen that the position of stage 210 was steadily drifting away from the position identified by the position encoder (e.g. in the Y axis of FIG. 15B). Further, FIG. 15B also shows that analytical microscope 120 likely experienced some sort of physical impact causing the last three lines of data points to become closer to each other (e.g. in the X axis of FIG. 15B). In the present example, the use of calibration element 220 is complementary to the use of a position encoder, and in some embodiments could be used as a replacement of the position encoder.

Having described various embodiments and implementations, it should be apparent to those skilled in the relevant art that the foregoing is illustrative only and not limiting, having been presented by way of example only. Many other schemes for distributing functions among the various functional elements of the illustrated embodiments are possible. The functions of any element may be carried out in various ways in alternative embodiments

What is claimed is:

1. A calibration element for an analytical microscope, comprising a multidimensional feature structure having an array of large features arranged in a substantially non-periodic pattern of substantially light features and substantially dark features, each of the large features comprising a plurality of small features arranged in a substantially non-periodic pattern of rows and columns, wherein the small features of the substantially light features include light reflecting structure that occurs at a >50% probability, and the small features the substantially dark features include light absorbing structure or light transmissive structure that occurs at a >50% probability, and further wherein the substantially light features and the substantially dark features exhibit contrast when illuminated by a light beam.

2. The calibration element of claim 1, wherein the light beam comprises a laser light beam.

3. The calibration element of claim 1, wherein the light beam comprises an infrared light beam.

4. The calibration element of claim 1, wherein the contrast is exhibited in reflection of the light beam.

5. The calibration element of claim 1, wherein the large features comprise a square dimension of about 40 µm and the small features comprise a square dimension of about 8 µm.

6. The calibration element of claim 1, wherein the light reflecting structure comprises metal-coated features.

7. The calibration element of claim 1, wherein the light absorbing structure comprises black-chrome-coated features.

8. The calibration element of claim 1, wherein the light absorbing structure comprises photoresist-coated features.

9. The calibration element of claim 1, wherein the substantially non-periodic pattern further includes a cross-hair.

10. The calibration element of claim 1, wherein the substantially non-periodic patterns of large features and small features do not repeat over at least two regions associated with a field of view of an objective lens.

11. The calibration element of claim 10, wherein a first region comprises a dimension in a range of between 50 and 600 µm, and a second region comprises a dimension in a range of between 5 and 60 µm.

12. The calibration element of claim 1, wherein the multidimensional feature structure is disposed on a slide.

13. The calibration element of claim 12, wherein the multidimensional feature structure is disposed on a bottom surface of the slide so that the substantially non-periodic pattern is imaged through the slide from above.

14. A magnification measurement system comprising:
a microscope stage configured for translation over known distances;
a calibration element disposed on the microscope stage, the calibration element comprising a multidimensional feature structure having an array of large features arranged in a substantially non-periodic pattern of substantially light features and substantially dark features, each of the large features comprising a plurality of small features arranged in a substantially non-periodic pattern of rows and columns, wherein the small features of the substantially light features include light reflecting structure that occurs at a >50% probability, and the small features the substantially dark features include light absorbing structure or light transmissive structure that occurs at a >50% probability, and further wherein the substantially light features and the substantially dark features exhibit contrast when illuminated by a light beam;
one or more detectors that collect a plurality of images of the multidimensional feature structure through an objective lens; and
a computer configured to determine a magnification level of the objective lens based on correlation of images of the multidimensional feature structure before and after translation.

15. The magnification measurement system of claim 14, wherein the computer is further configured to identify the objective lens that acquired the images based on closest match between the determined magnification level and one of a plurality of magnification levels each associated with an embodiment of an objective lens.

16. The magnification measurement system of claim 14, wherein the detectors include a spectrometer.

17. The magnification measurement system of claim 14, wherein the detectors include an optical camera.

18. The magnification measurement system of claim 14, wherein the contrast is exhibited in reflection of the light beam.

19. The magnification measurement system of claim 14, wherein the light reflecting structure comprises metal-coated features.

20. The magnification measurement system of claim 14, wherein the light absorbing structure comprises black-chrome-coated features.

21. The magnification measurement system of claim 14, wherein the light absorbing structure comprises photoresist-coated portions.

22. The magnification measurement system of claim 14, wherein the calibration element comprises a cross-hair element.

23. The magnification measurement system of claim 14, wherein the substantially non-periodic patterns of large features and small features do not repeat over at least two regions associated with a field of view of an objective lens.

24. The magnification measurement system of claim 23, wherein a first region comprises a dimension in a range of between 50 and 600 microns, and a second region comprises a dimension in a range of between 5 and 60 microns.

25. The magnification measurement system of claim 14, wherein the calibration element is disposed on a sample slide mounted on the microscope stage.

26. The magnification measurement system of claim 25, wherein the calibration element is disposed on a bottom surface of the slide so that the calibration element is imaged through the slide from above.

27. The magnification measurement system of claim 14, wherein the calibration element is mounted on the microscope stage.

28. A method for measuring magnification, comprising:
acquiring an image of a multidimensional feature structure having an array of large features arranged in a substantially non-periodic pattern of substantially light features and substantially dark features, each of the large features comprising a plurality of small features arranged in a substantially non-periodic pattern of rows and columns, wherein the small features of the substantially light features include light reflecting structure that occurs at a >50% probability, and the small features the substantially dark features include light absorbing structure or light transmissive structure that occurs at a >50% probability, and further wherein the substantially light features and the substantially dark features exhibit contrast when illuminated by a light beam, and the multidimensional feature structure is disposed on a stage of an analytical microscope;
translating the stage over a known distance;
acquiring a second image of the multidimensional feature structure; and
determining a magnification level of an objective lens that acquired the first image and the second image based on a correlation of the multidimensional feature structure in the first image and the second image.

29. The method of claim 28, further including identifying the objective lens that acquired the first image and the second image based on closest match between the determined magnification level and one of a plurality of magnification levels each associated with an embodiment of an objective lens.

30. The method of claim 28, wherein the first image and second image comprises an analytical image.

31. The method of claim 28, wherein the first image and second image comprises an optical image.

32. A method for determining a shift between images, comprising:
acquiring an optical image of a multidimensional feature structure having an array of large features arranged in a substantially non-periodic pattern of substantially light features and substantially dark features, each of the large features comprising a plurality of small features arranged in a substantially non-periodic pattern of rows and columns, wherein the small features of the substantially light features include light reflecting structure that occurs at a >50% probability, and the small features the substantially dark features include light absorbing structure or light transmissive structure that occurs at a >50% probability, and further wherein the substantially light features and the substantially dark features exhibit contrast when illuminated by a light beam, and the multidimensional feature structure is disposed on a stage of an analytical microscope;

acquiring an analytical image of the multidimensional feature structure; and determining a shift between the optical image and the analytical image based on a correlation of the multidimensional feature structure in the optical image and the analytical image.

33. The method of claim 32, wherein the shift indicates a difference of relative alignment between an optical detector and an analytical detector.

\* \* \* \* \*